(12) United States Patent
Bogorodzki et al.

(10) Patent No.: US 8,901,503 B2
(45) Date of Patent: Dec. 2, 2014

(54) RADIATION DETECTOR SYSTEM AND METHOD

(75) Inventors: Adam Gregory Bogorodzki, Ontario (CA); Janusz Skierski, Ontario (CA); Hieronim Stanislaw Teresinski, Ontario (CA); George Yan, Ontario (CA); Abraham Mahdessian, Ontario (CA)

(73) Assignee: Canberra Industries, Inc., Meriden, CT (US)

(*) Notice: Subject to any disclaimer, the term of this patent is extended or adjusted under 35 U.S.C. 154(b) by 119 days.

(21) Appl. No.: 13/451,102

(22) Filed: Apr. 19, 2012

(65) Prior Publication Data
US 2013/0277565 A1 Oct. 24, 2013

(51) Int. Cl.
*G01T 1/20* (2006.01)

(52) U.S. Cl.
CPC .................... *G01T 1/2008* (2013.01)
USPC ........................................................ 250/367

(58) Field of Classification Search
USPC ................. 250/367, 370.01–370.15
See application file for complete search history.

(56) References Cited

U.S. PATENT DOCUMENTS

| | | | |
|---|---|---|---|
| 3,777,161 A * | 12/1973 | Lee .......................... | 250/361 R |
| 5,317,158 A * | 5/1994 | McElhaney et al. .......... | 250/367 |
| 5,399,869 A | 3/1995 | Usuda | |
| 5,410,156 A * | 4/1995 | Miller ...................... | 250/390.04 |
| 5,483,070 A * | 1/1996 | Valenta ...................... | 250/366 |
| 5,514,870 A | 5/1996 | Langenbrunner | |
| 6,671,541 B2 * | 12/2003 | Bishop et al. ................. | 600/436 |
| 7,180,074 B1 * | 2/2007 | Crosetto .................. | 250/370.09 |
| 7,388,206 B2 | 6/2008 | Ivan | |
| 7,683,334 B2 | 3/2010 | Farsoni et al. | |
| 7,800,070 B2 * | 9/2010 | Weinberg et al. ........ | 250/363.03 |
| 2005/0139777 A1* | 6/2005 | Rostaing et al. .............. | 250/394 |
| 2008/0156993 A1* | 7/2008 | Weinberg et al. ........ | 250/363.03 |
| 2009/0039271 A1* | 2/2009 | Farsoni et al. ................. | 250/367 |
| 2010/0294943 A1* | 11/2010 | Frank .............................. | 250/367 |
| 2011/0163237 A1 | 7/2011 | Akers et al. | |
| 2012/0132814 A1* | 5/2012 | Weinberg ...................... | 250/362 |

FOREIGN PATENT DOCUMENTS

JP 2007 010332 A 1/2007

OTHER PUBLICATIONS

Seiichi Yamamoto et al., "Development of an alpha/beta/gamma detector for radiation monitoring", Review of Scientific Instruments, AIP, Melville, NY, US, vol. 82, No. 11, N Nov. 1, 2011, pp. 13503-1-13503-6, XP012152135, ISSN: 0034-6748, DOI: 10.1063/1.3658821.

E. G. Shapiro et al., "Dual Energy Analysis Using Phoswich Scintillation Detectors for Low-Level In-Vivo Counting", IEEE Transactions on Nuclear Science, vol. NS-21, No. 1, Feb. 1, 1974, pp. 201-209, XP001426792.

* cited by examiner

*Primary Examiner* — Kiho Kim
*Assistant Examiner* — Taeho Jo
(74) *Attorney, Agent, or Firm* — David /w. Carstens; Sudhakar V. Allada; Carstens & Cahoon, LLP

(57) ABSTRACT

A radiation detector system/method that simultaneously detects alpha/beta, beta/gamma, or alpha/beta/gamma radiation, within an integrated detector is disclosed. The system incorporates a photomultiplier tube with radiation scintillation materials to detect alpha/beta/gamma radiation. The photomultiplier tube output is then shape amplified and fed through discriminators to detect the individual radiation types. The discriminator outputs are fed to anti-coincidence and pulse width and timing analysis module that determines whether individual alpha/beta/gamma pulses are valid and should be counted by corresponding alpha/beta/gamma pulse radiation counters. The system may include a radiation detection method to affect alpha/beta/gamma radiation detection in a variety of contexts. The system/method may be implemented in a variety of applications, including but not limited to whole body radiation contamination detectors, laundry radiation scanners, tool/article radiation detectors, and the like.

30 Claims, 24 Drawing Sheets

| PULSE PRESENCE | | | DECISION |
|---|---|---|---|
| ALPHA | BETA | GAMMA | RESULT |
| ✘ | ✘ | ✘ | ✘ |
| ✘ | ✘ | ✓ | GAMMA |
| ✘ | ✓ | ✘ | BETA |
| ✘ | ✓ | ✓ | GAMMA |
| ✓ | ✘ | ✘ | ALPHA |
| ✓ | ✘ | ✓ | ALPHA |
| ✓ | ✓ | ✘ | ALPHA |
| ✓ | ✓ | ✓ | ALPHA |

RADIATION DETECTOR SYSTEM AND METHOD

CROSS REFERENCE TO RELATED APPLICATIONS

Not Applicable

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods for the detection of radiation, more particularly, but not by way of limitation, to the use of these devices to detect alpha, beta, and gamma radiation. While not limitive of the invention teachings, the present invention may in some circumstances be advantageously applied to categories including U.S. Patent Classification 250/367.

The current detection technologies for ionizing radiation in contamination monitoring are gas flow and thin plastic scintillation. The present invention proposes a radiation detector incorporating an integrated radiation detection methodology that provides a compact and sensitive radiation detector for a variety of system applications.

PRIOR ART AND BACKGROUND OF THE INVENTION

Prior Art System Overview (0100)

Within the prior art of radiation detectors as applied to whole body radiation contamination monitors, conventional prior art systems typically utilize gas flow detectors or thin plastic scintillation detectors or combinations of these two as generally illustrated in FIG. 1 (0100). This diagram indicates that in the context of a whole body radiation contamination detector/monitor/scanner typically is configured to detect radiation on a human subject (0101) via means of a number of gas flow radiation detectors (0102, 0103, 0104) in conjunction with a thin plastic scintillation radiation detector (0105).

Within this context, integrated scintillation detectors are not used in contamination monitoring, other than hand and foot monitors. Existing solutions for beta/gamma detection imposes significant, physical separation between the beta and gamma detectors (gamma detector further away from monitored object), resulting in:
  Gamma signal attenuated by the beta detector; and
  a Reduced gamma signal due to R-squared law distance from the monitored object.

Exemplary Prior art covering multi-band radiation detection includes the following:
  U.S. Pat. No. 7,683,334 for SIMULTANEOUS BETA AND GAMMA SPECTROSCOPY;
  U.S. Pat. No. 7,388,206 for PULSE SHAPE DISCRIMINATION METHOD AND APPARATUS FOR HIGH-SENSITIVITY RADIOISOTOPE IDENTIFICATION WITH AN INTEGRATED NEUTRON-GAMMA RADIATION DETECTOR;
  U.S. Pat. No. 5,514,870 for FAST CSI-PHOSWICH DETECTOR; and
  U.S. Pat. No. 5,399,869 for PHOSWICH DETECTORS HAVING OPTICAL FILTER FOR CONTROLLING PULSE HEIGHT AND RISE TIME OF OUTPUT FROM SCINTILLATOR.

This prior art does not teach any methodology by which multi-band radiation detectors may be economically fabricated to address a wide variety of system applications, including but not limited to whole body radiation contamination detectors/monitors/scanners.

Deficiencies in the Prior Art

While the use of multi-detector whole body radiation contamination detectors/monitors/scanners has been field-proven for many years, they have certain limitations. The prior art as detailed above suffers from the following deficiencies:
Gas Flow Detector Limitations
  Applicable for alpha and beta radiation only.
  Use of gas adds inconvenience and operational cost.
  a Has some negative environmental impact by releasing methane or $CO_2$ into the atmosphere.
  Available gamma option suffers from physical separation between monitored body and gamma detectors that are located behind as detectors resulting in reduced gamma detection efficiency.
Thin Plastic Scintillation Detector Limitations
  Practical only for beta or beta/alpha detection without discrimination.
  Available gamma option suffers from physical separation between monitored body and gamma detectors that are located behind gas detectors, thus reducing gamma detection efficiency.

More compact detectors, with increased sensitivity to alpha, beta, and gamma ionizing radiation would improve the performance of whole body contamination monitors. Additional possible applications for a compact radiation detector are for laundry radiation monitors and tool & articles radiation monitors, where cost and smaller physical space requirements are important considerations. However, the prior art does not teach how such compact and integrated detectors can be fabricated, despite the fact that integrated scintillation detectors have been studied for some spectroscopy applications.

While some of the prior art may teach some solutions to several of these problems, the core requirement for multiple radiation detectors to detect a multiplicity of radiation types in these prior art systems has not been addressed by the prior art.

OBJECTIVES OF THE INVENTION

Accordingly, the objectives of the present invention are (among others) to circumvent the deficiencies in the prior art and affect the following objectives:
(1) Provide for a radiation detector system and method that integrates scintillation, detectors to detect a multiplicity of radiation types.
(2) Provide for a radiation detector system and method that improves detector efficiency and sensitivity by integrating a multiplicity of detectors in a compact physical structure.
(3) Provide for a radiation detector system and method that reduces the cost of whole body radiation contamination detectors/monitors/scanners.
(4) Provide for a radiation detector system and method that increases radiation signal detection efficiency.
(5) Provide for a radiation detector system and method that reduces crosstalk between alpha, beta, and gamma radiation detection signals.
(6) Provide for a radiation detector system and method that minimizes electronic noise between the detected radiation signals.
(7) Provide for a radiation detector system and method to discriminate different radiation types with a single integrated, detector and photomultiplier tube (PMT).
(8) Provide for a radiation detector system and method that permits whole body radiation contamination systems to be significantly cost reduced.
(9) Provide for a radiation detector system and method that increases beta sensitivity by using an anti-coincident discrimination technique to reduce gamma background in the beta channel.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

System Overview

The present invention system generally comprises a photomultiplier tube in conjunction with radiation scintillation materials to detect alpha, beta, and gamma radiation. The photomultiplier tube output is shape amplified before be fed through discriminators to detect the individual radiation types. The discriminator outputs are then fed to an anti-coincidence analysis module that determines whether individual alpha, beta, and gamma pulses are valid and should be counted by corresponding alpha, beta, and gamma pulse radiation counters.

The present invention system may incorporate any selected combination of the above characteristics to achieve the overall design goals consistent with the objectives detailed above.

Method Overview

The system may be augmented by a radiation detection method to affect alpha/beta/gamma radiation detection/monitoring/scanning in a variety of contexts. The method may be implemented in a variety of applications, including but not limited to whole body radiation contamination detectors, laundry radiation scanners, tool/article radiation detectors, and the like.

Integration of this and other preferred exemplary embodiment methods in conjunction with a variety of preferred exemplary embodiment systems described herein is anticipated by the overall scope of the present invention.

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

Figure 1:
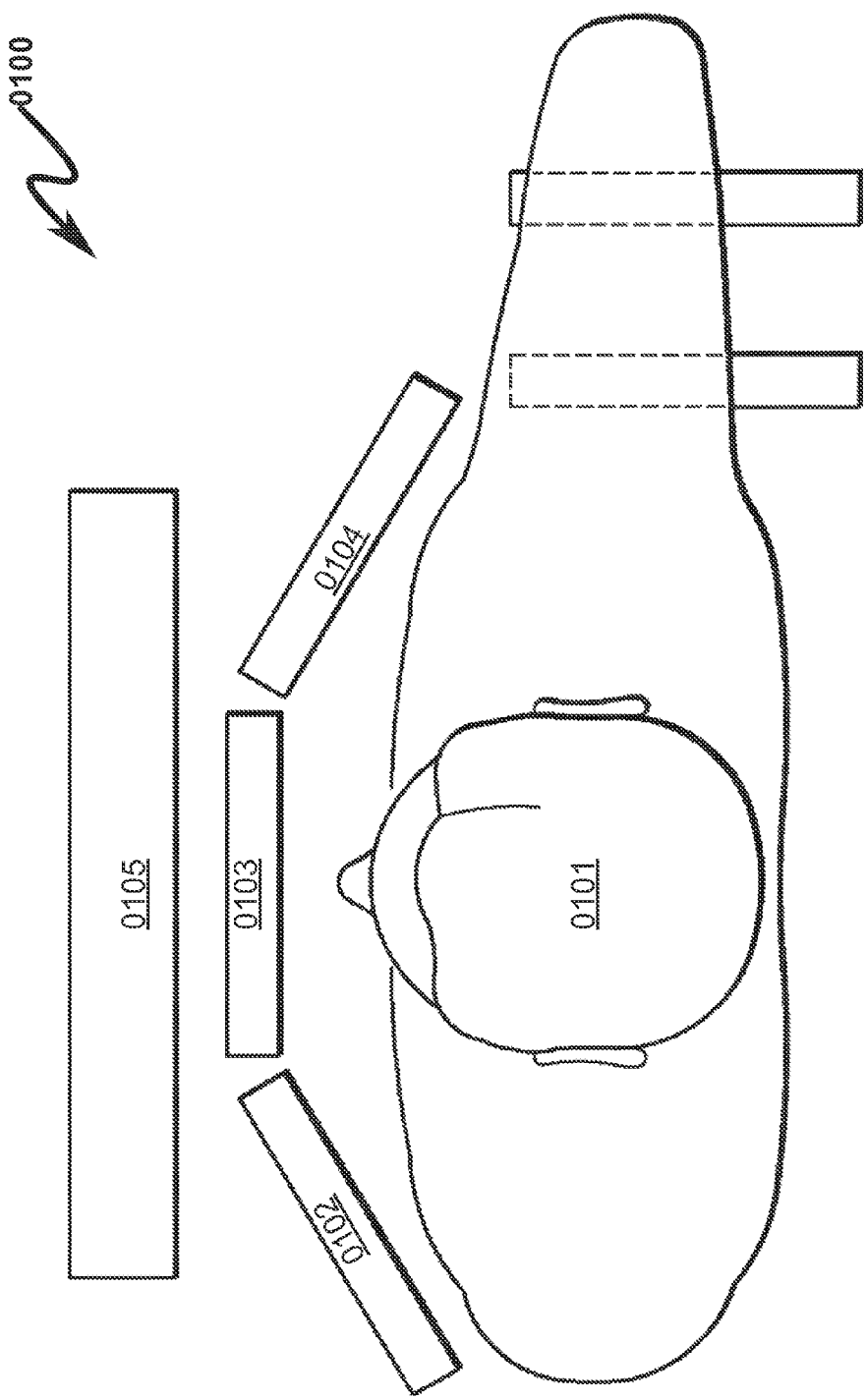
FIG. 1 illustrates a top view of a prior art radiation detector system as applied to a whole body radiation contamination, monitor, showing relative distances between the alpha/beta detectors and the gamma detector as well as the distance between the alpha/beta detectors and the person being monitored.

While this invention is susceptible of embodiment in many different forms, there is shown in the drawings and will herein be described in detailed preferred embodiment of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a RADIATION DETECTOR SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Detector Not Limitive

The present invention may be utilized as a radiation detector in a wide variety of contexts which may include radiation monitoring and/or scanning applications. Thus, the term "detector" or "detection" should be given its broadest possible meaning to include, among other things, radiation monitoring and/or radiation scanning.

Combined Radiation Detection Not Limitive

The present invention may be utilized as a radiation detector in a wide variety of contexts wherein more than one band of radiation must be detected. While the disclosed embodiment is capable of simultaneously detecting alpha, beta, and gamma radiation, the invention should not be limited to simultaneous detection of these three radiation groups. For example, the present invention specifically anticipates that embodiments may be constructed to detect alpha/beta, beta/gamma, or alpha/beta/gamma radiations. These embodiments may be specifically tailored to detect these combinations or in some configurations be configurable to detect these radiation band combinations in response to some form of data entry, possibly via a computer system running software read from a computer readable medium.

Array Stack Not Limitive

The present invention may incorporate a variety of scintillation materials in a variety of mechanical configurations in order to affect the detection of radiation in a number of radiation types. Within this document the term "array stack" may be used to describe the configuration of the scintillation material, but it should not be construed a limiting the scope of the invention. "Array Stack" should be given its broadest possible meaning when applied to multi-layer scintillation materials used to detect radiation when used in conjunction with photomultiplier tube or tubes.

Scintillation/Shielding Plate Ordering Not Limitive

The present invention makes no limitation on the ordering of scintillation, plates in the radiation detector.

Nominal Values Not Limitive

The present invention as depicted herein may include specified "nominal" values in some preferred exemplary embodiments. These values should not be deemed as limitive of the invention scope and are merely typical values.

Time Constant Not Limitive

The present invention anticipates a wide variety of scintillation materials may be used in the construction of the ISD described herein. Within this context, many preferred system embodiments will utilize an alpha scintillation plate comprising a scintillation material having a medium time constant, a beta scintillation plate comprising a scintillation material having a short time constant, and a gamma scintillation plate comprising a scintillation material having a long time constant. Within this context, the terms "short", "medium", and "long" are relative in nature only and may vary widely based on application. Thus, these terms are not limitive of the scope of the invention.

Exemplary System Context (0200)

Figure 2:
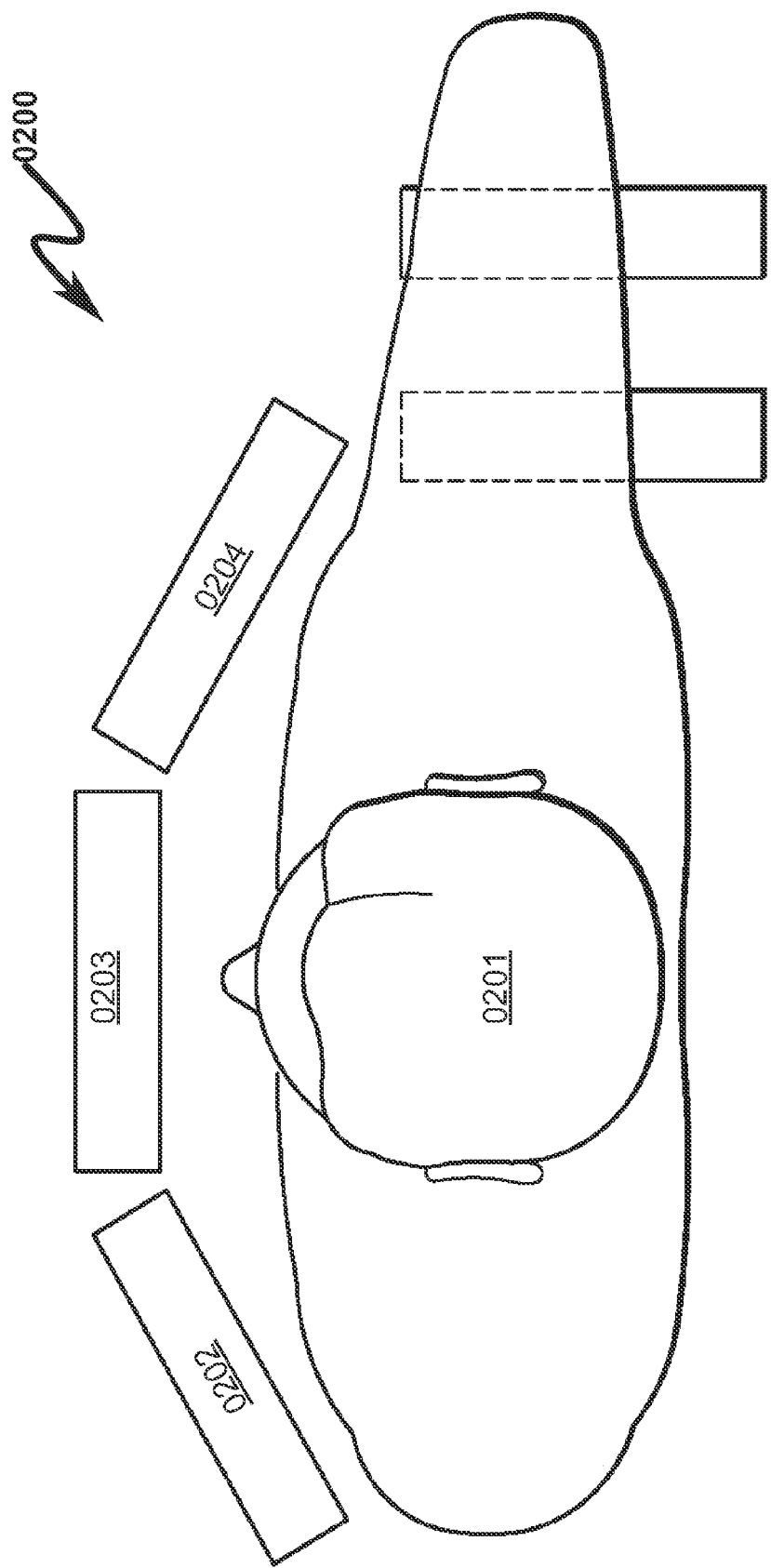
FIG. 2 illustrates a top view of a preferred exemplary embodiment of the present invention system as applied to a whole body radiation contamination monitor.

While the present invention is applicable to a wide variety of applications, several are preferred. Of these, a whole body radiation detector/monitor/scanner application is generally illustrated in FIG. 2 (0200) wherein the human subject (0201) is scanned using several integrated radiation scanners (0202, 0203, 0204) as will be discussed herein.

Exemplary System Embodiment (0300)

Figure 3:
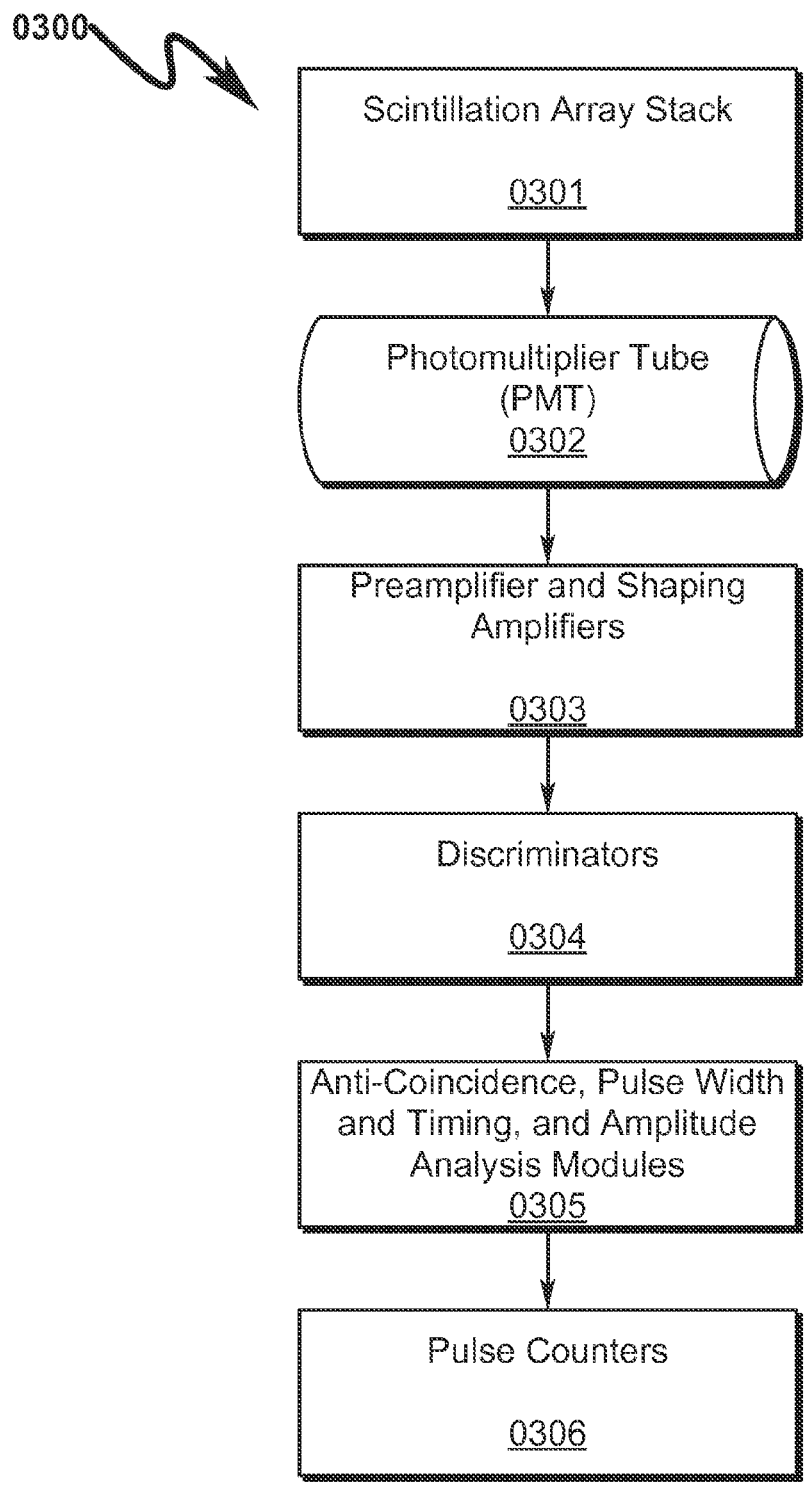
FIG. 3 illustrates a system block diagram describing a presently preferred embodiment of the present invention.

The present invention at its broadest level may be described a depicted by the system block diagram in FIG. 3 (0300). Generally speaking, the invention system utilizes a scintillation, array stack (0301) as the radiation detection mechanism. This array stack (0301) feeds a photomultiplier tube (0302) whose output is converted by shaping amplifiers (0303) for use by discriminators (0304) to select various radiation types based on the output of the shaping amplifiers (0303). The discriminator (0304) output is then fed into an anti-coincidence module that ensures that only radiation of a proper band is triggered for counting. Finally, the anti-coincidence module (0305) output is fed into radiation counters (0306) that count radiation event within each radiation band.

This system block diagram does not limit the number of any element depicted in FIG. 3 (0300) and may be applied to any number of radiation band combinations, including but not limited to alpha/beta, beta/gamma, or alpha/beta/gamma radiations as indicated above.

System Construction Description (0400, 0500)

Figure 4:
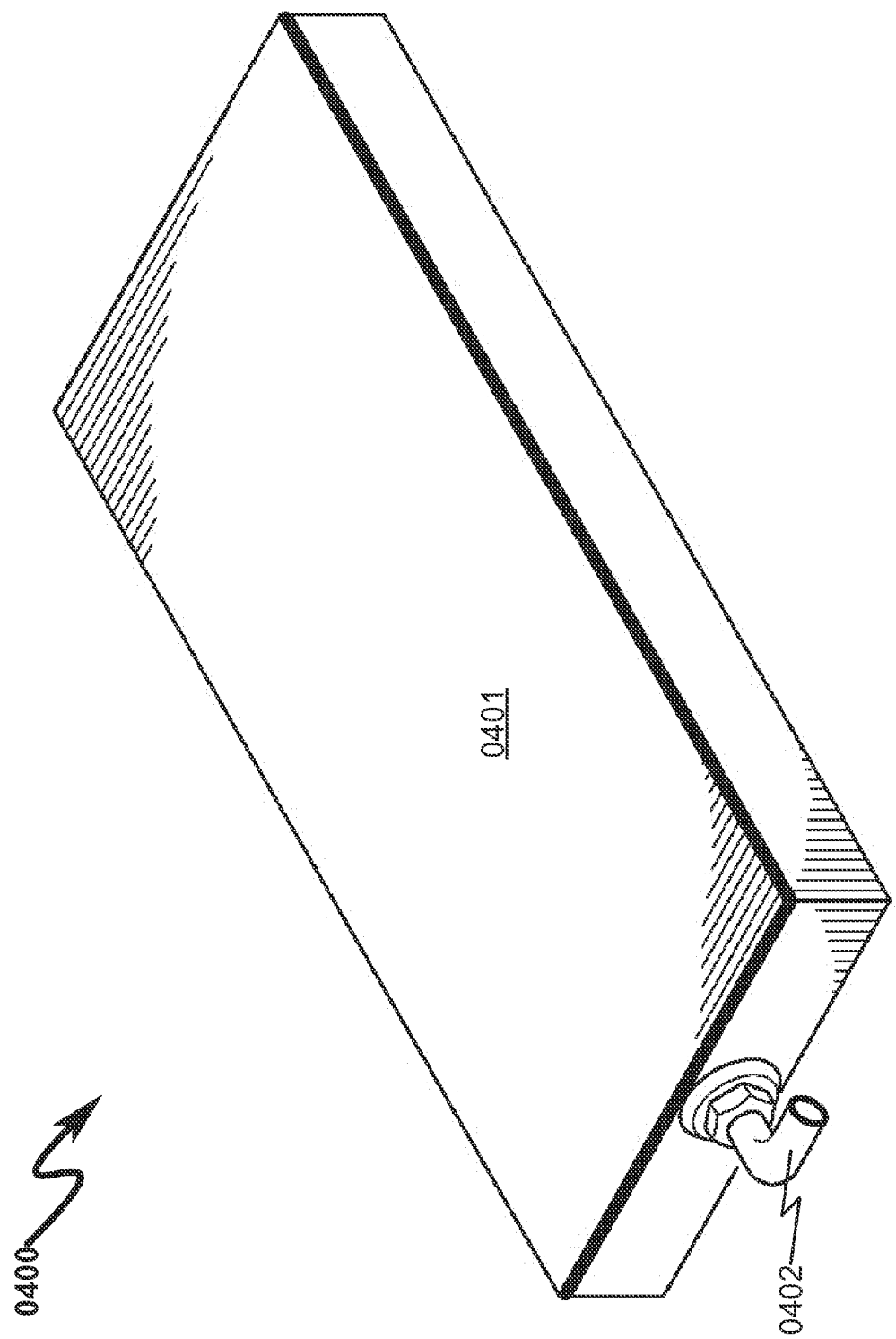
FIG. 4 illustrates a perspective view of a preferred exemplary embodiment of the present invention system.

An exemplary system construction for a preferred embodiment of the present invention is generally illustrated in FIG. 4 (0400), wherein the radiation detector comprises an integrated body structure (0401) with associated photomultiplier tube (PMT) wiring harness/bulkhead (0402).

Figure 5:
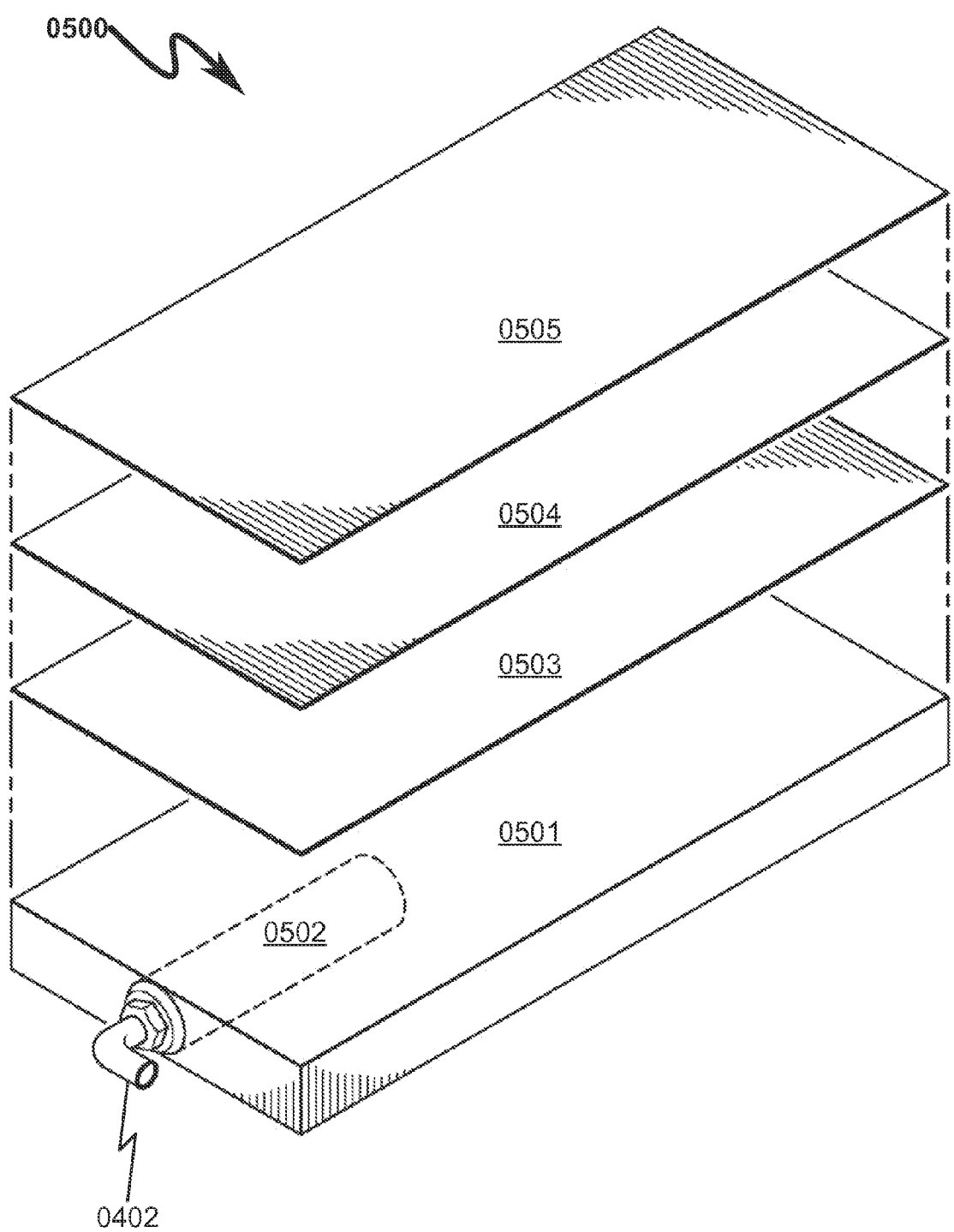
FIG. 5 illustrates a detailed assembly view of a preferred exemplary embodiment of the present invention system.

This structure (0400) may be better understood by inspecting the assembly view of FIG. 5 (0500), wherein the detector case (0501) and photomultiplier tube (0502) are integrated with a beta particle shield (0503) and a number of scintillation plates such as a beta scintillator (0504) alpha scintillator (0505) and gamma scintillator incorporated into the detector case (0501) that are responsive to radiation externally impinging the overall structure (0500).

Within this context, the alpha particle detector (0505) may comprise a thin foil covered with alpha sensitive material (such as 0), optically bonded to a foil covered with beta sensitive material (0504). To prevent high energy beta radiation from impinging on the gamma sensitive substrate enclosure (0501) (typically PVT) a beta blocker (0503) can be inserted between the gamma scintillator enclosure (0501) and the beta scintillator (0504).

A photomultiplier tube (PMT) (0502) is inserted within the plastic substrate enclosure (0501), thus significantly increasing the detection of radiation as compared to the configurations detailed in the prior art.

The scintillation, materials for detecting alpha, beta and gamma radiation are chosen so that their time constants are medium, short, and long, respectively. The layers (0503, 0504, 0505) and substrate (0501) are encasulated in light-tight wrapping with only the PMT electrical leads exposed (0402) for connection to a preamplifier or other electronics as a single unit. This entire assembly, including one PMT (0502) may be termed an integrated Scintillation Detector (ISD) and assembled in a variety of configurations, one preferred embodiment as indicated in FIG. 4 (0400). This integrated construction methodology results in significant cost savings, since only one PMT is utilized to detect all alpha, beta, and gamma radiation.

System Operation Description (0600)

Figure 6:
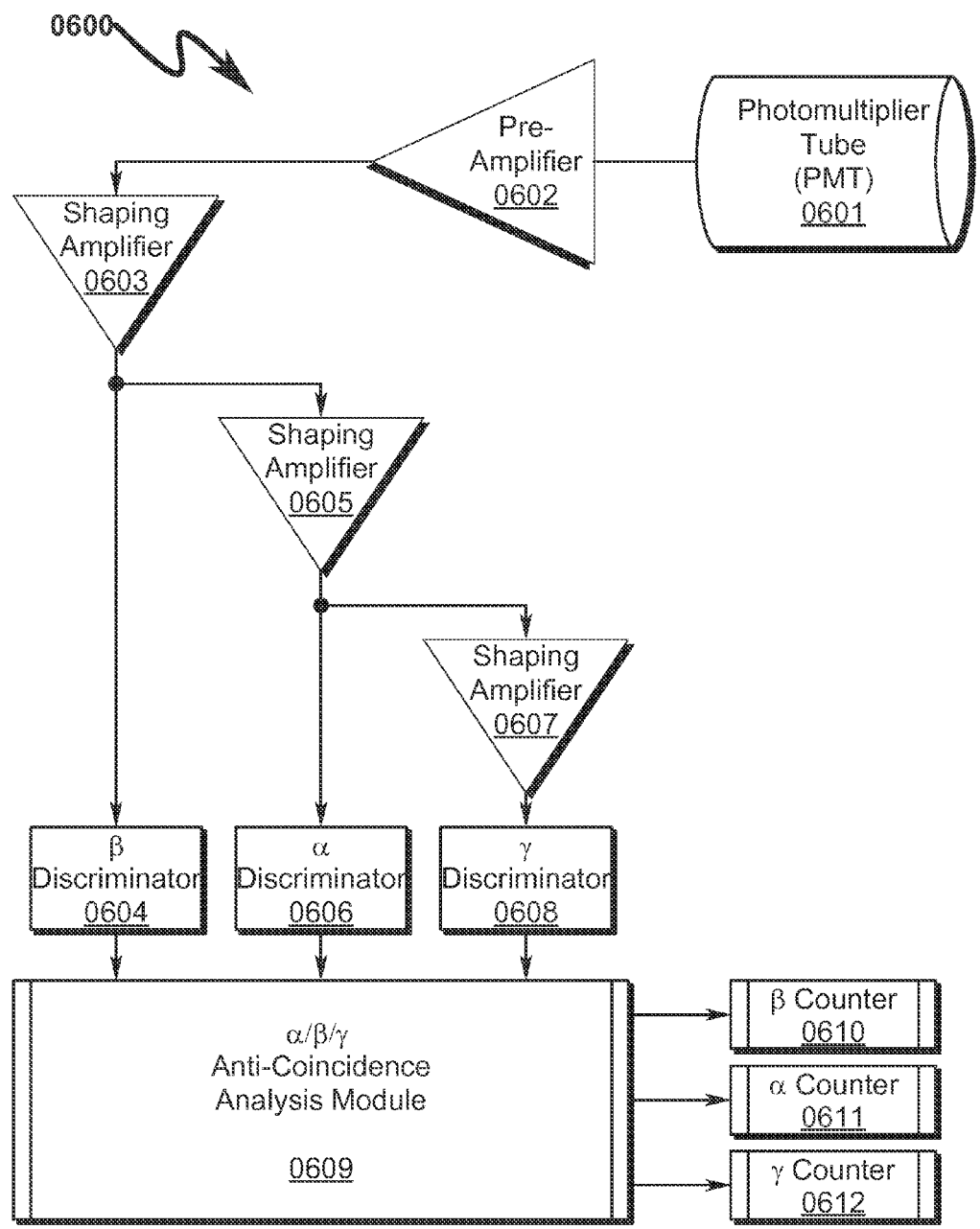
FIG. 6 illustrates an exemplary system block diagram of the electrical subsystems comprising a preferred exemplary embodiment of the present invention.

The operation of an exemplary radiation detection electronics portion of the system can best be described by the system block diagram of FIG. 6 (0600). While FIG. 6 (0600) illustrates a general block diagram of the signal conditioning and anti-coincidence circuit associated with one (ISD), it should be noted that a multiplicity of ISDs may be deployed for typical system applications, such as the whole body radiation detection/monitoring/scanning systems.

A disclosed method is detailed herein to identify the pulses coming from the alpha, beta, and gamma scintillators through a single PMT. Key to this disclosed method is a scheme to evaluate the decay time constants of the pulse from the PMT and decide what sort of radiation is received. The electrical waveform is typically choppy and noisy due to the physical nature of the alpha and beta radiation and scintillator response.

The objectives of the signal conditioning and anti coincidence circuit are:

increase signal detection efficiency;

reduce crosstalk between the alpha, beta, and gamma signals; and minimize electronic noise.

Referring to FIG. 6 (0600), within one preferred exemplary embodiment of the invention there are three main sub-functions in this methodology: analog signal processing, digital signal processing, and anti-coincidence.

Analog Signal Processing

The PMT assembly (0601) may optionally contain a preamplifier (0602) that amplifies the signal from PMT with an optimal gain of approximately 5. This optional pre-amplifier (0602) substantially increases noise immunity.

The optionally amplified. PMT signal is first processed by a shaping amplifier (0603) comprising a series of DC-coupled wide bandwidth amplifiers and filters. Classic LC filters are preferred because the operating frequencies are generally in MHz range. The signal then goes to the comparators that process beta pulses (0604). Other pulses are present at this stage as well (see the digital processing section below).

The second stage shaping amplifier (0605) optimally consists of a unity gain buffer followed by a low pass 10 MHz, 3-pole filter. The filter typically reduces amplification in pass band by a factor of 2 due to impedance matching. The signal is then inspected by comparators that process alpha pulses (0606). Beta pulses are assumed to be already filtered out at this point.

The third stage shaping amplifier (0607) optimally has high gain of approximately 100 and it, is followed by a low pass, 3 pole, 3 MHz filter. The output goes to comparators that process gamma pulses (0608).

Discriminator Module Detail (0700)

Figure 7:
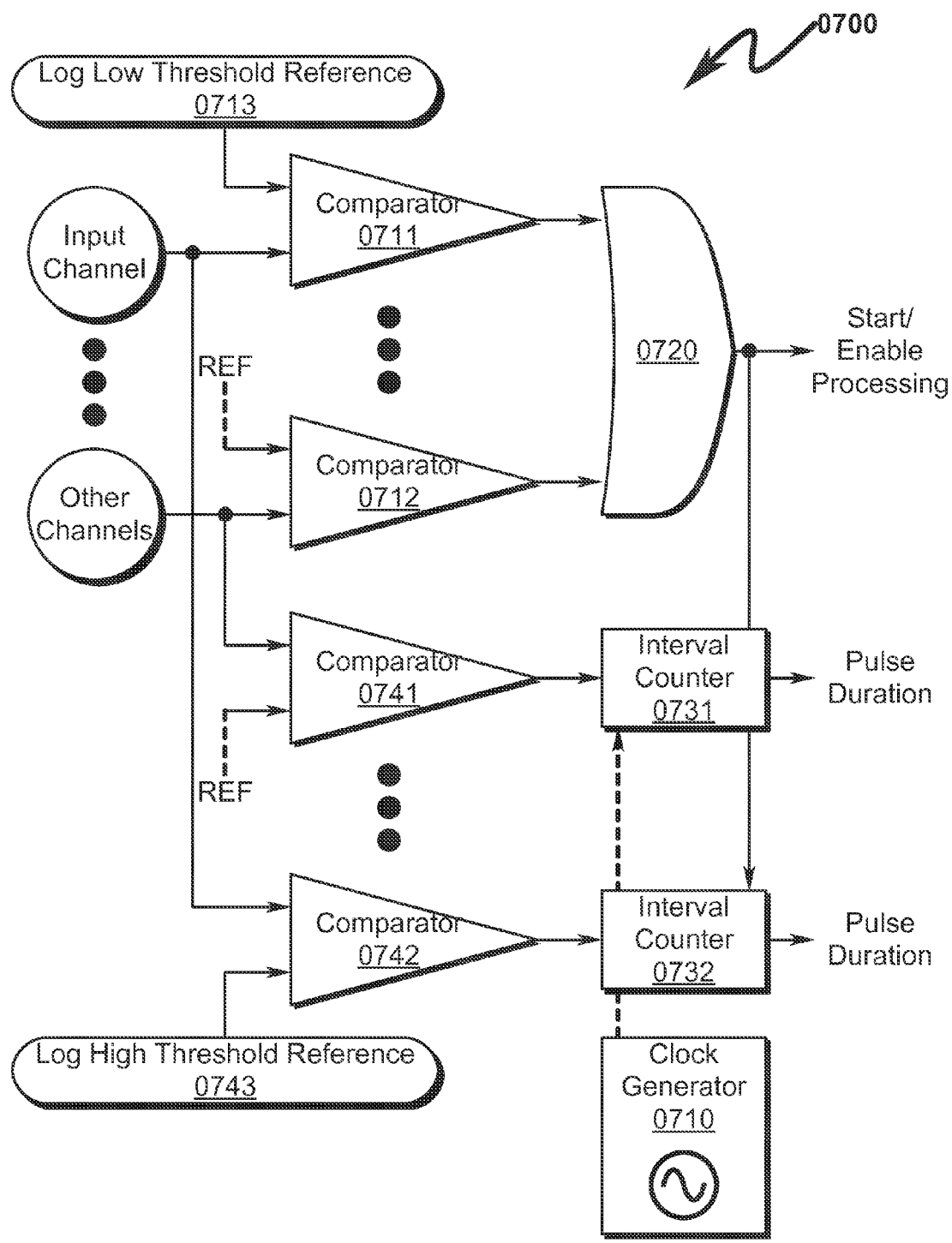
FIG. 7 illustrates a schematic overview of exemplary discriminator circuitry useful in some preferred embodiments of the present invention.

While many methodologies are possible to implement the discriminator modules (0604, 0606, 0608) generally illustrated in FIG. 6 (0600), one preferred embodiment of this functionality is generally illustrated in FIG. 7 (0700). The discriminator modules (0604, 0606, 0608) measure the pulse amplitude and length in the beta, alpha, and gamma channels respectively. Each discriminator module has a number of comparators (0711, 0712) with thresholds set on the logarithmic scale (0713). The number of comparators (0711, 0712) and threshold levels (0713) are chosen to cover the range of amplitudes of alpha, beta and gamma pulses. The digital processing starts when the selected low level comparator is triggered in any channel (0720) and ends when all comparators in all the channels become inactive (0720).

The length of the pulse in each channel is then measured (0731, 0732) for the duration of time when the selected upper level comparator is activated (0741, 0742). The resulting time is then assessed whether it fits in a bracket of valid pulse lengths for the channel. If it does, the pulse in that channel is considered valid, otherwise it is not valid.

Anti-Coincidence Module Logic (0800)

As generally illustrated in FIG. 6 (0600), the anti-coincidence module (0609) makes a determination whether the resulting pulse is alpha, beta, or gamma. It works according to the following logic. If alpha pulse is valid, then the resulting pulse is alpha and alpha counter (0611) is advanced, else if gamma pulse is valid, then the resulting pulse is gamma and gamma counter (0612) is advanced, else if beta pulse is valid, then the resulting pulse is beta and beta counter (0610) is advanced, else the pulse is rejected and no counter is advanced.

Figure 8:
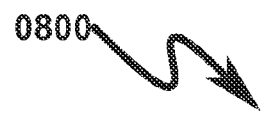
FIG. 8 illustrates a logic decision table useful in some preferred embodiments of the present invention.

This decision logic is generically illustrated in FIG. 8 (0800), wherein the depicted truth table can be utilized to implement this functionality both within the digital and analog domains. Thus, while the anti-coincidence analysis module is thought to be optimally implemented using digital logic, the present invention anticipates that this functionally could also be implemented within the analog domain. The avoidance of hard logic "0" and "1" values in this truth table anticipates the use of analog decision making techniques that incorporate logic levels with more than two stable states such as neural nets and the like.

Alpha-Beta System Block Diagram (0900)

Figure 9:
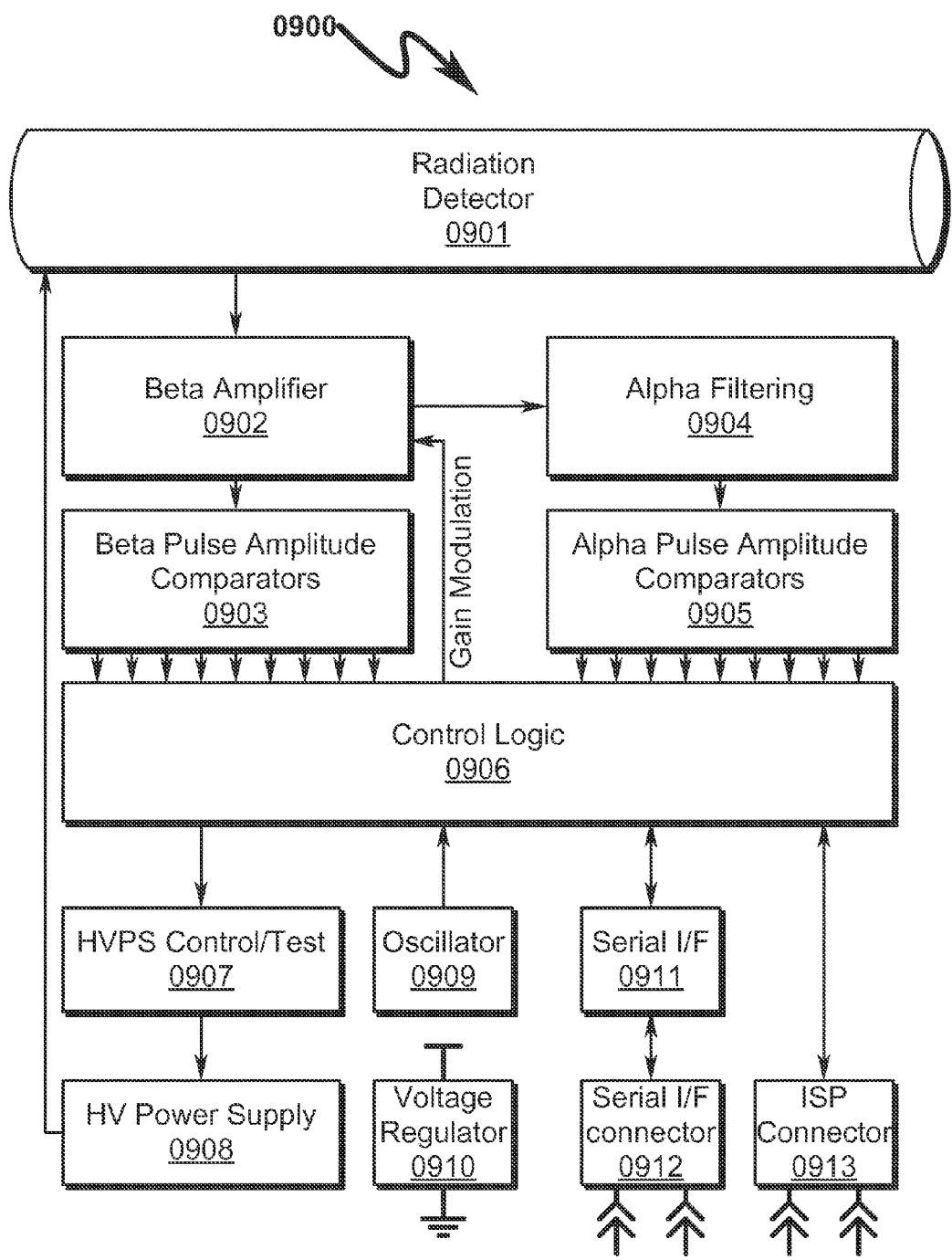
FIG. 9 illustrates a system block diagram of a preferred exemplary embodiment of the present invention implementing alpha/beta radiation detection.

A preferred exemplary embodiment of the present invention as applied to alpha-beta radiation detection is generally illustrated in the system block diagram of FIG. 9 (0900). In this configuration, the radiation detector (0901) (typically an ISD incorporating scintillation plate stack and photomultiplier tube with optional embedded preamplifier) generates output that is amplified by an alpha/beta amplifier (0902) and compared using beta pulse amplitude comparators (0903). Additionally, the output of the alpha/beta amplifier (0902) is alpha filtered (0904) and used as input to alpha pulse amplitude comparators (0905). Control logic (0906) (typically in the form of a microprocessor or microcontroller) takes the comparator outputs (0903, 0905) and performs pulse width discrimination and other analyses to determine what type of radiation pulse has been detected and in what quantity. This system may also include digital controls to affect gain modulation of one or more amplifies in the system.

Ancillary support circuitry may typically include a high voltage power supply control and test circuitry (0907), high voltage power supply (0908), oscillator (0909), voltage regulator (0910), serial interface (0911), communications connector interface (0912), and/or in-circuit programming provisions (0913). One skilled in the art will recognize that while the ancillary support circuits detailed herein are typical of a practical system configuration, they may be augmented or modified widely based on the particular application context.

Beta-Gamma System Block Diagram (1000)

Figure 10:
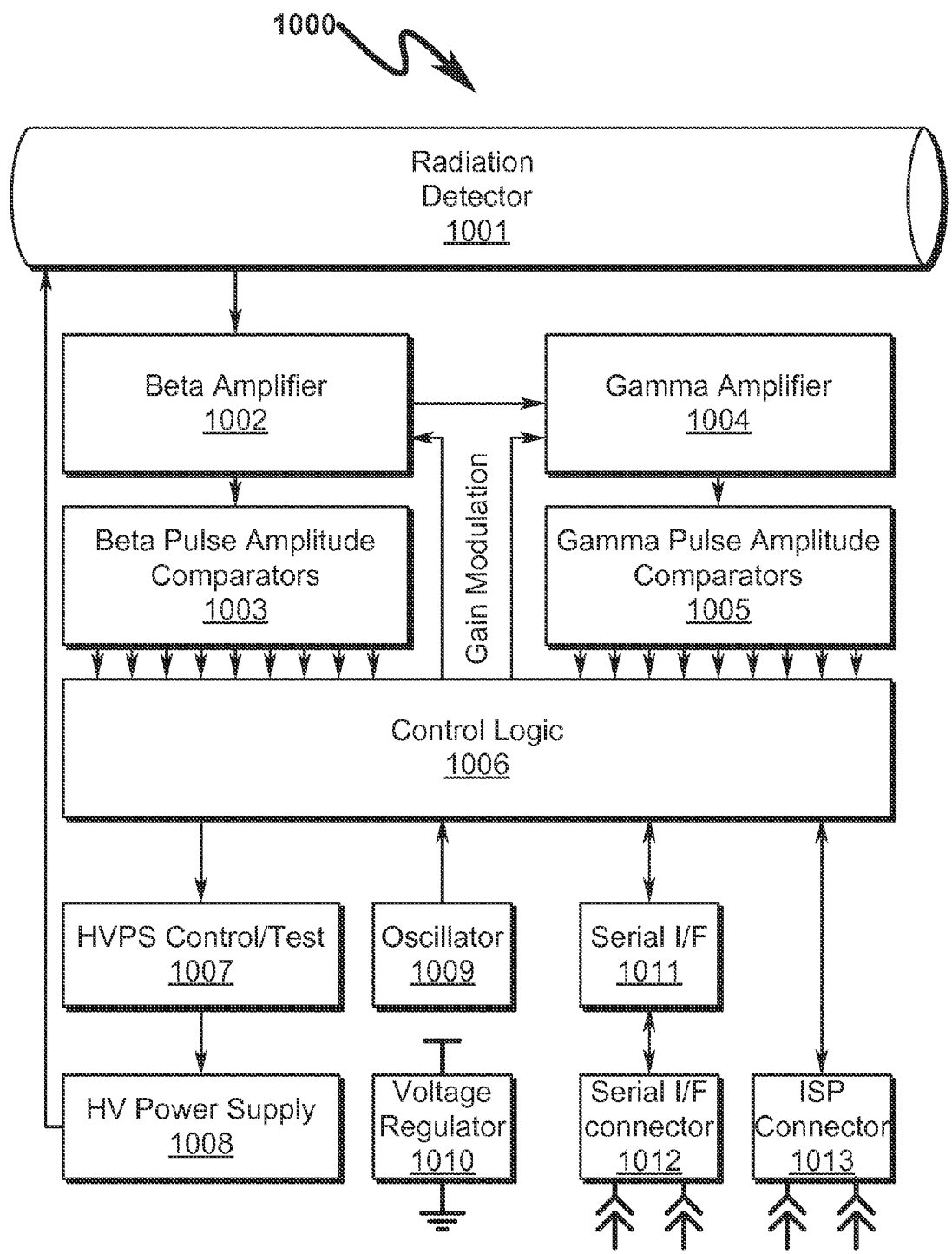
FIG. 10 illustrates a system block diagram of a preferred exemplary embodiment of the present invention implementing beta/gamma radiation detection.

A preferred exemplary embodiment of the present invention, as applied to beta-gamma radiation detection is generally illustrated in the system block diagram of FIG. 10 (1000). In this configuration, the radiation detector (1001) (typically an ISD incorporating scintillation plate stack and photomultiplier tube with optional embedded preamplifier) generates output that is amplified by a beta/gamma amplifier (1002) and compared using beta pulse amplitude comparators (1003). Additionally, the output of the beta/gamma amplifier (1002) is fed to a gamma amplifier (1004) and used as input to gamma pulse amplitude comparators (1005). Control logic (1006) (typically in the form of a microprocessor or microcontroller) takes the comparator outputs (1003, 1005) and performs pulse width discrimination and other analyses to determine what type of radiation pulse has been detected and in what quantity. This system may also include digital controls to affect gain modulation of one or more amplifiers in the system.

Ancillary support, circuitry may typically include a high voltage power supply control and test circuitry (1007), high voltage power supply (1008), oscillator (1009), voltage regulator (1010), serial interface (1011), communications connector interface (1012), and/or in-circuit programming provisions (1013). One skilled in the art will recognize that while the ancillary support circuits detailed herein are typical of a practical system configuration, they may be augmented or modified widely based on the particular application context.

Photomultiplier Tube Configuration (1100)

Figure 11:
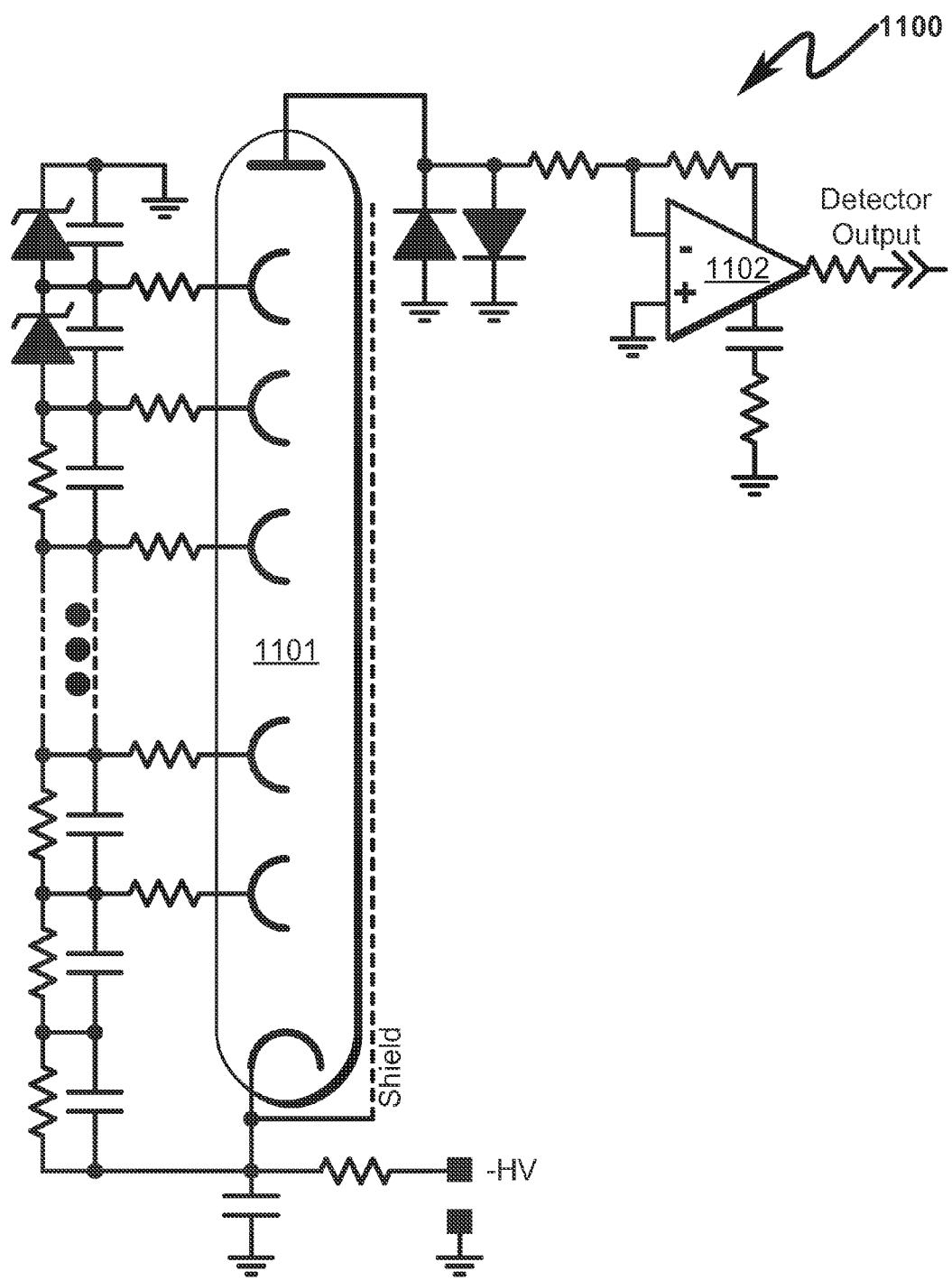
FIG. 11 illustrates a schematic of a preferred exemplary embodiment of photomultiplier tube circuitry associated with some embodiments of the present invention.

An exemplary photomultiplier tube configuration useful in some preferred embodiments of the present invention is generally illustrated in FIG. 11 (1100). In this context the photomultiplier tube (1101) is powered by a high voltage power supply in conjunction with a resistive divider. Output from the photomultiplier tube (1101) may be optionally amplified before being used as input for other components within the overall radiation detection system.

Within, this context, some preferred embodiments utilize a preamplifier (1102) proximal to the photomultiplier tube (1101) to improve noise immunity and obtain optimal detector sensitivity. While many preamplifiers may be suitable for this application, the use of a model AD8099 Ultra-Low Distortion High Speed Op Amp from Analog Devices, Inc. is preferred in many embodiments.

Aloha/Beta/Gamma Amplifier (1200)

Figure 12:
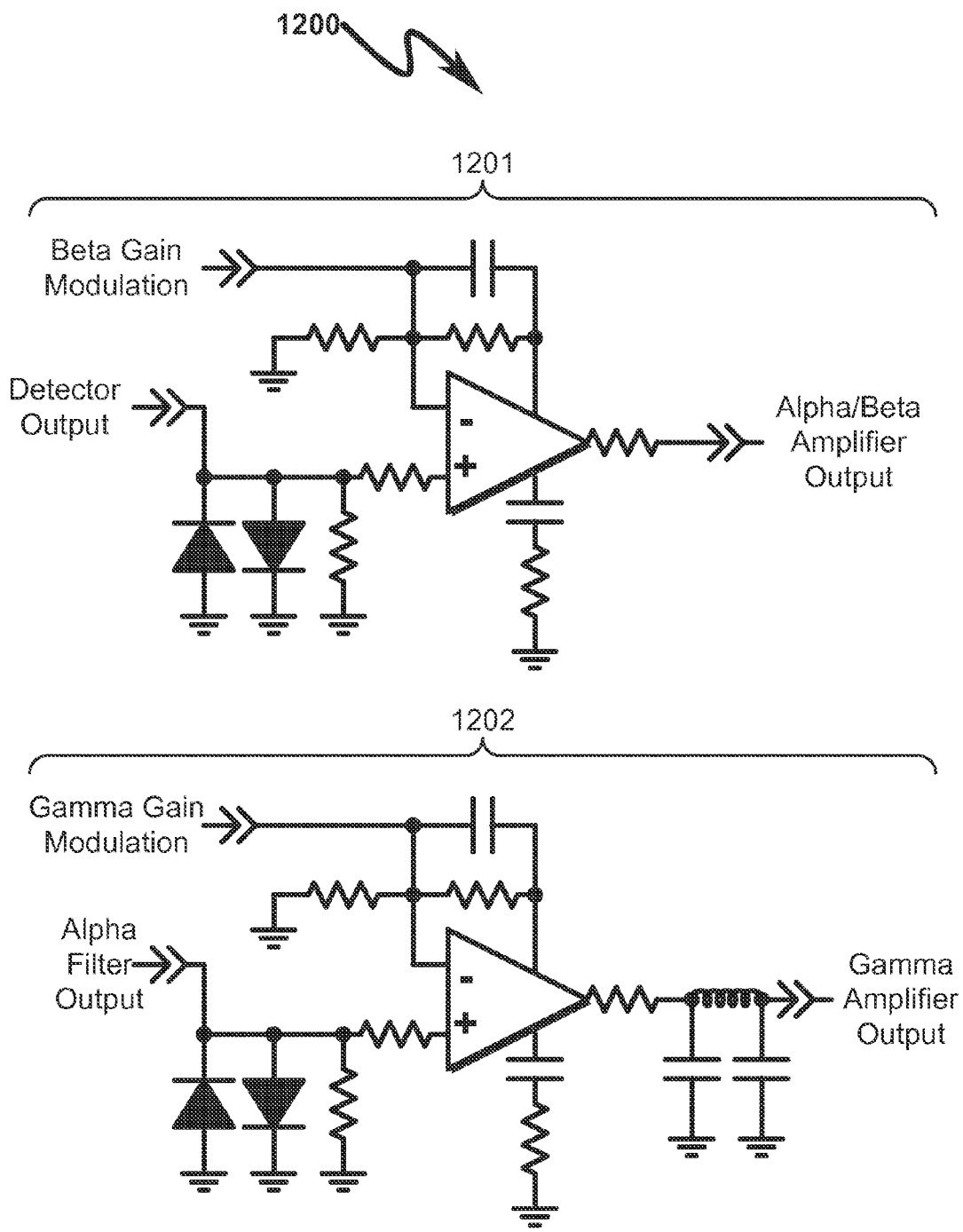
FIG. 12 illustrates a schematic of a preferred exemplary embodiment of alpha/beta preamplifier circuitry associated with some embodiments of the present invention.

The present invention may in some preferred embodiments utilize a variety of amplifier configurations to process the radiation pulse signatures obtained from the radiation detector (as typically illustrated in FIG. 11 (1100)). To this end, an exemplary alpha/beta amplifier (1201) and gamma amplifier (1202) configuration are generally illustrated in FIG. 12 (1200). The use of a model AD8099 Ultra-Low Distortion High Speed Op Amp from Analog Devices, Inc. is preferred in many of these exemplary invention embodiments.

The shaping amplifier configurations (1201, 1202) generally illustrated in FIG. 12 (1200) may also incorporate a wide variety of digitally switched beta and/or gamma gain modulation inputs that modify the feedback behavior of the operational amplifiers in response to digital controls from the control logic (0906, 1006) generally depicted in FIG. 9 (0900) and FIG. 10 (1000).

Aloha Filtering (1300)

A preferred exemplary embodiment of an alpha filtering block (FIG. 9 (0904)) useful in some invention embodiments is generally illustrated in FIG. 12 (1200). This filtering block may be utilized in some preferred embodiments with the alpha/beta/gamma amplifiers (1201, 1202) illustrated in FIG. 12 (1200).

Aloha Comparator (1400)

Figure 13:
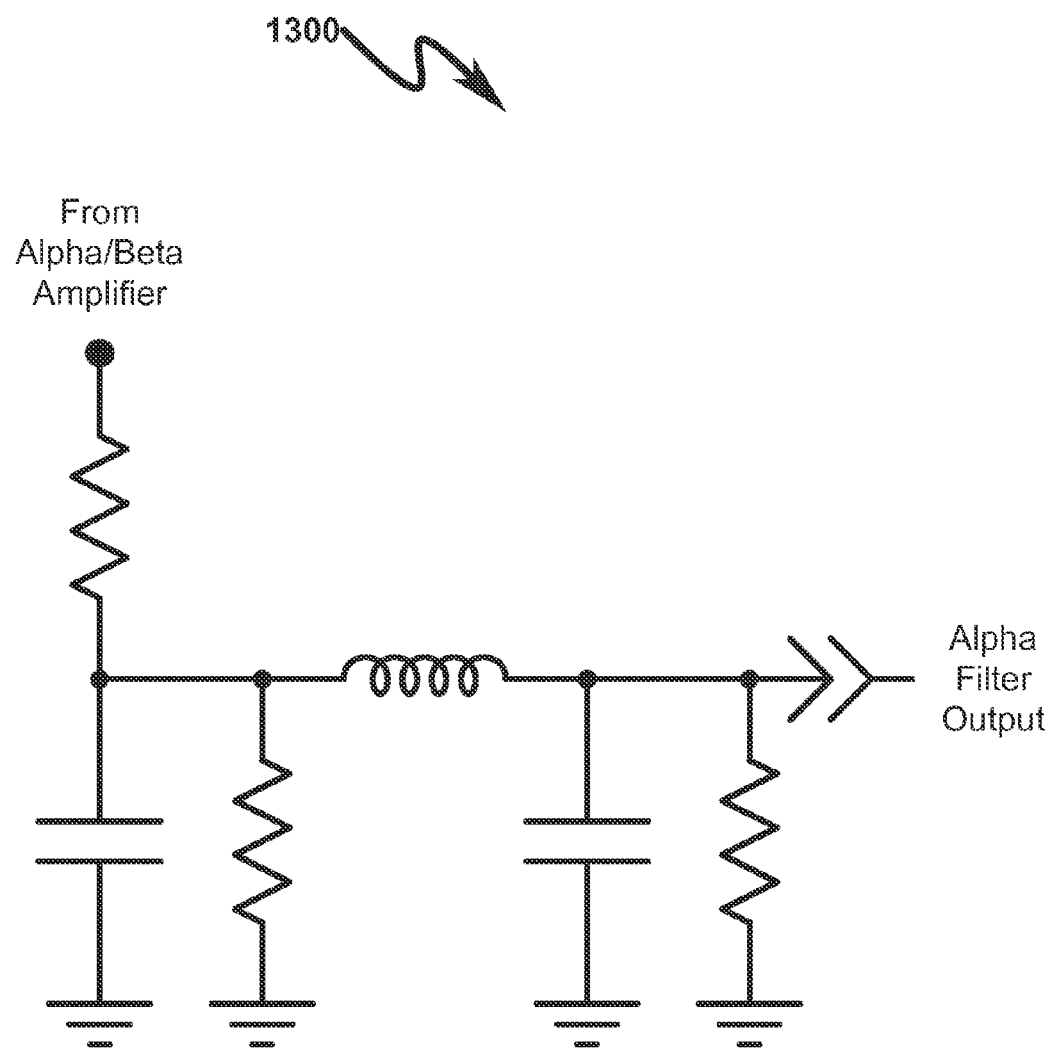
FIG. 13 illustrates a schematic of a preferred exemplary embodiment of alpha filtering circuitry associated with some embodiments of the present invention.
Figure 14:
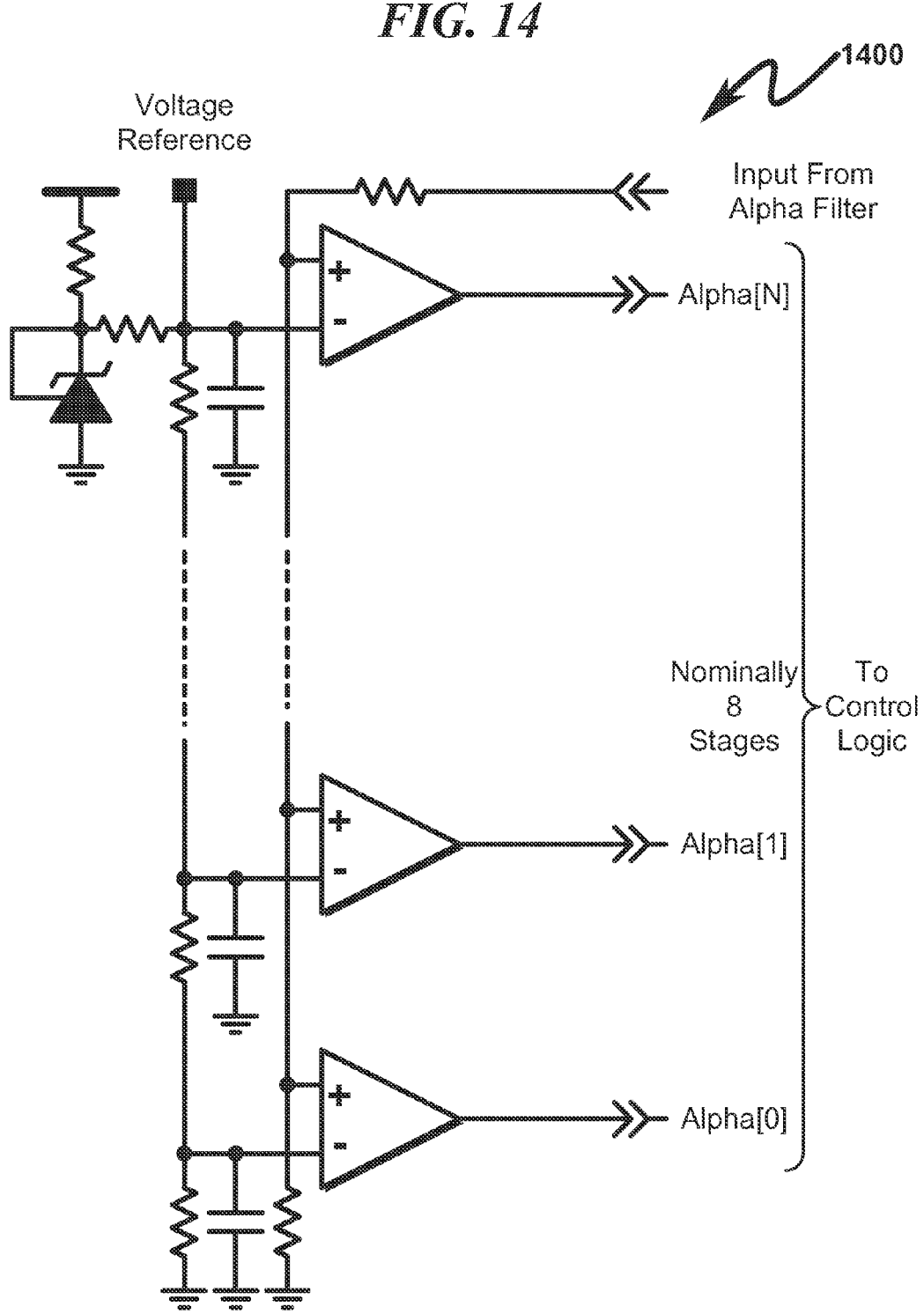
FIG. 14 illustrates a schematic of a preferred exemplary embodiment of alpha comparator circuitry associated with some embodiments of the present invention.

While amenable to a wide variety of implementations, a preferred embodiment of an alpha amplitude detector is generally illustrated in FIG. 14 (1400). Here a cascading string of comparators (nominally 8) are used in conjunction with a resistive divider string and appropriate filtering to provide instantaneous determination of the amplitude threshold associated with the alpha pulses. Note that the input to this comparator string is derived from the alpha filter described in FIG. 13 (1300). One skilled in the art may approach this design with different implementations without departing from the spirit of the invention.

Beta Comparator (1500)

Figure 15:
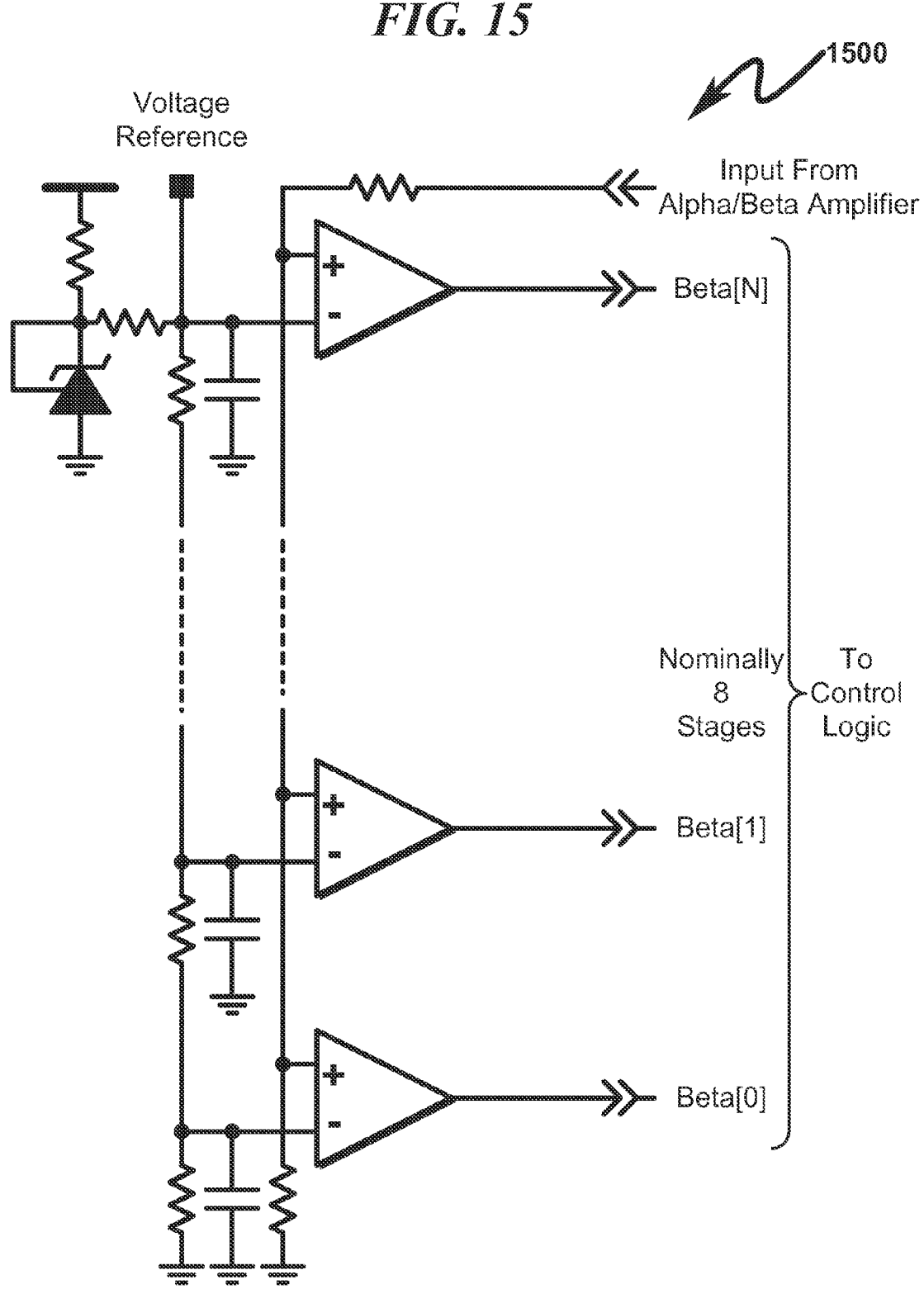
FIG. 15 illustrates a schematic of a preferred exemplary embodiment of beta comparator circuitry associated with some embodiments of the present invention.

While amenable to a wide variety of implementations, a preferred embodiment of a beta amplitude detector is generally illustrated in FIG. 15 (1500). Here a cascading string of comparators (nominally 8) are used in conjunction with a resistive divider string and appropriate filtering to provide instantaneous determination of the amplitude threshold associated with the beta pulses. One skilled in the art may approach this design with different implementations without departing from the spirit of the invention.

Gamma Comparator (1600)

Figure 16:
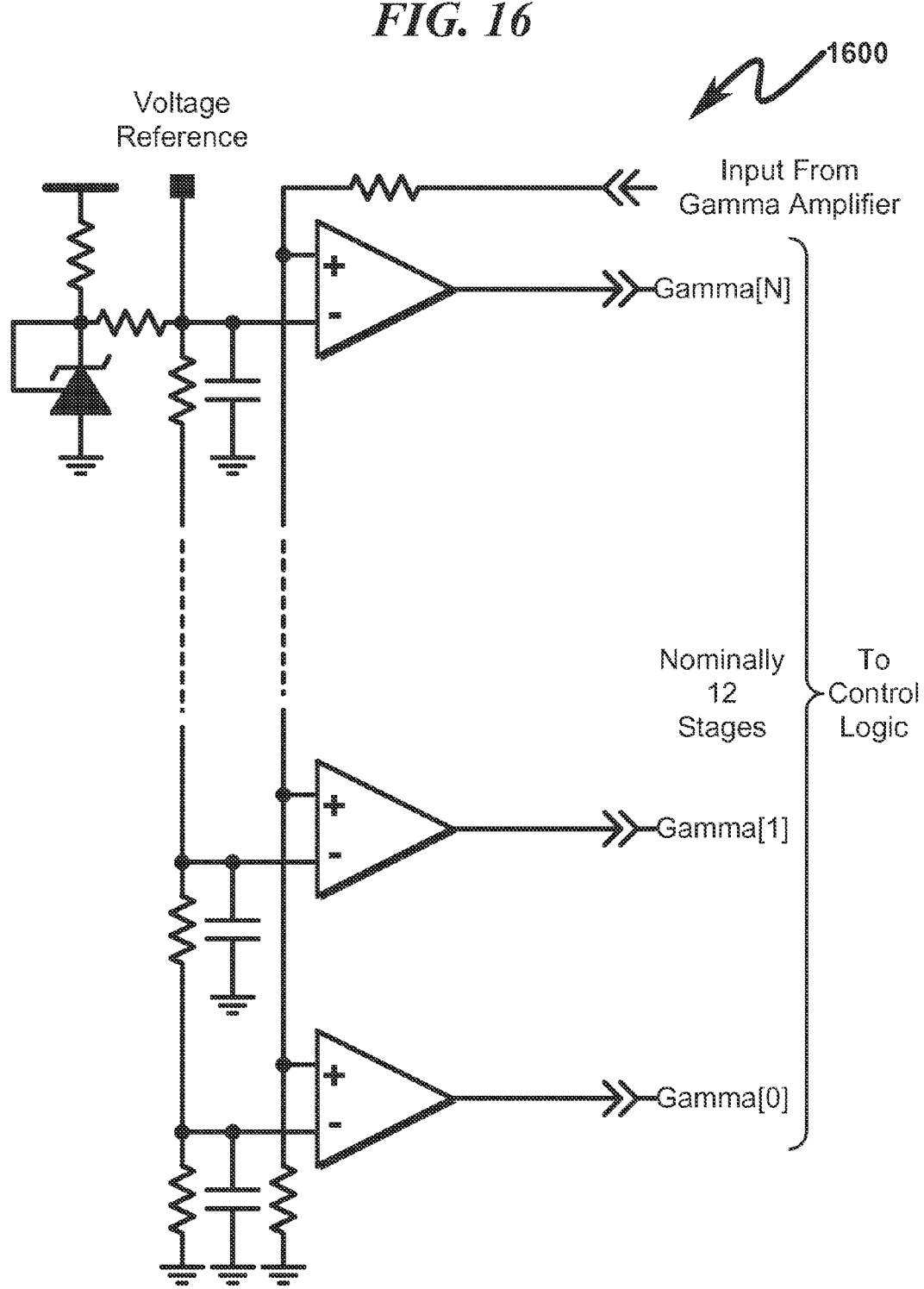
FIG. 16 illustrates a schematic of a preferred exemplary embodiment of gamma comparator circuitry associated with some embodiments of the present invention.

While amenable to a wide variety of implementations, a preferred embodiment of a gamma amplitude detector is generally illustrated in FIG. 16 (1600). Here a cascading string of comparators (nominally 12) are used in conjunction with a resistive divider string and appropriate filtering to provide instantaneous determination of the amplitude threshold associated with the gamma pulses. One skilled in the art may approach this design with different implementations, without departing from the spirit of the invention.

Exemplary Application—Whole Body Radiation Detector (1700)

The present invention has application to a variety of radiation detection contexts, several of which are preferred. One of these is in the construction of a whole body radiation detector/monitor/scanner. This whole body detector/monitor/scanner application may be constructed in a wide variety of configurations, with one preferred embodiment presented in FIG. 17 (1700). Within this context, a plethora of radiation detectors (1711, 1712, 1713, 1714, 1721, 1722, 1723, 1724, 1731, 1732, 1733, 1734) may be arrayed to detect radiation over an extended spatial area and/or volume.

Arraying of integrated scintillation, detectors (ISD) as described in FIG. 4 (0400) and FIG. 5 (0500) in this application permits simultaneous acquisition of different types of radiation while allowing more accurate analysis of acquired data resulting from improved sensitivity (reduced detector-to-source distance) and reduced scanning time.

Laundry Radiation Monitor System Application (1800, 1900)

Figure 18:
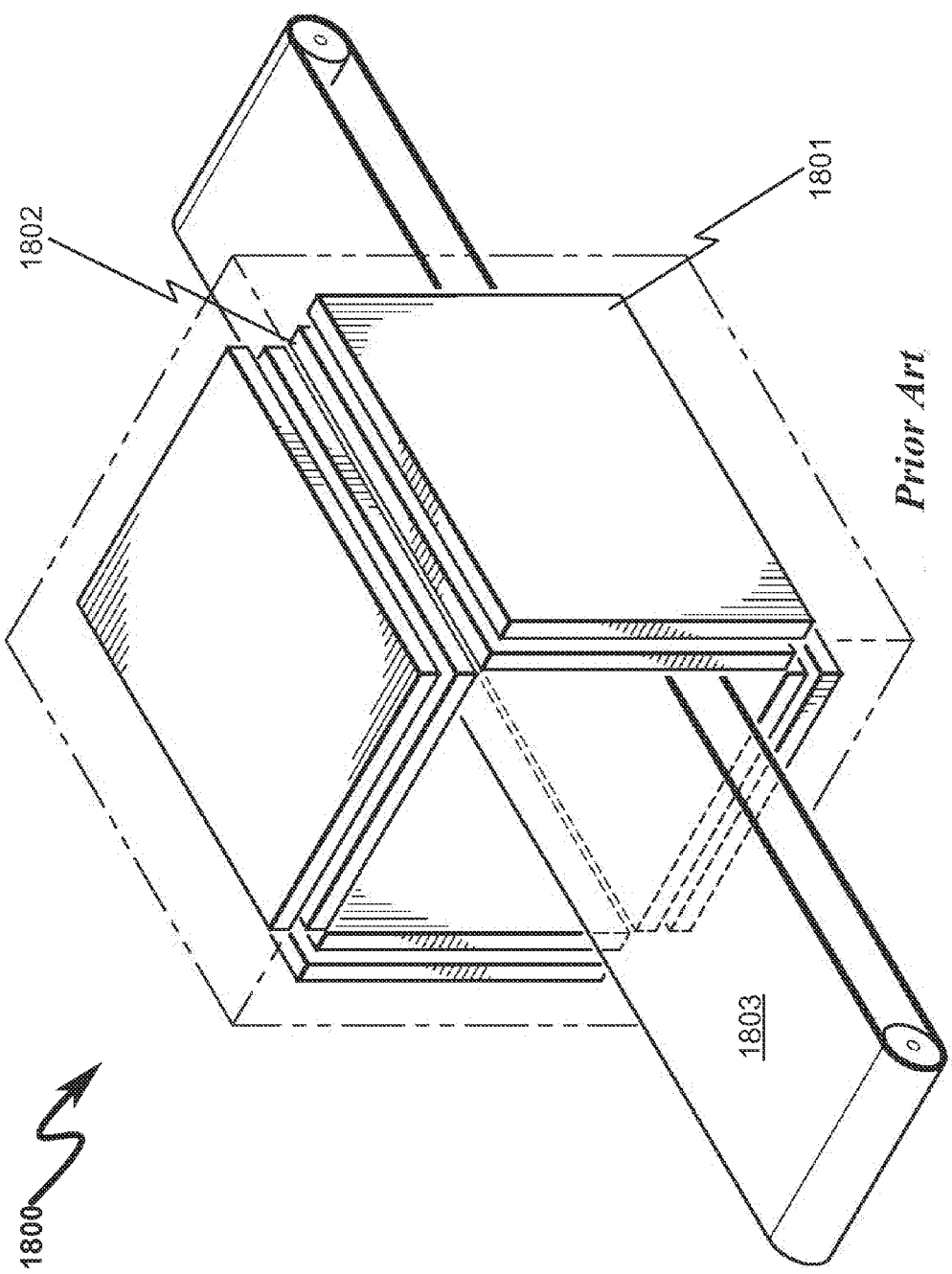
FIG. 18 illustrates an exemplary prior art laundry radiation monitoring system utilizing prior art alpha/beta detectors and separate plastic gamma detectors.
Figure 19:
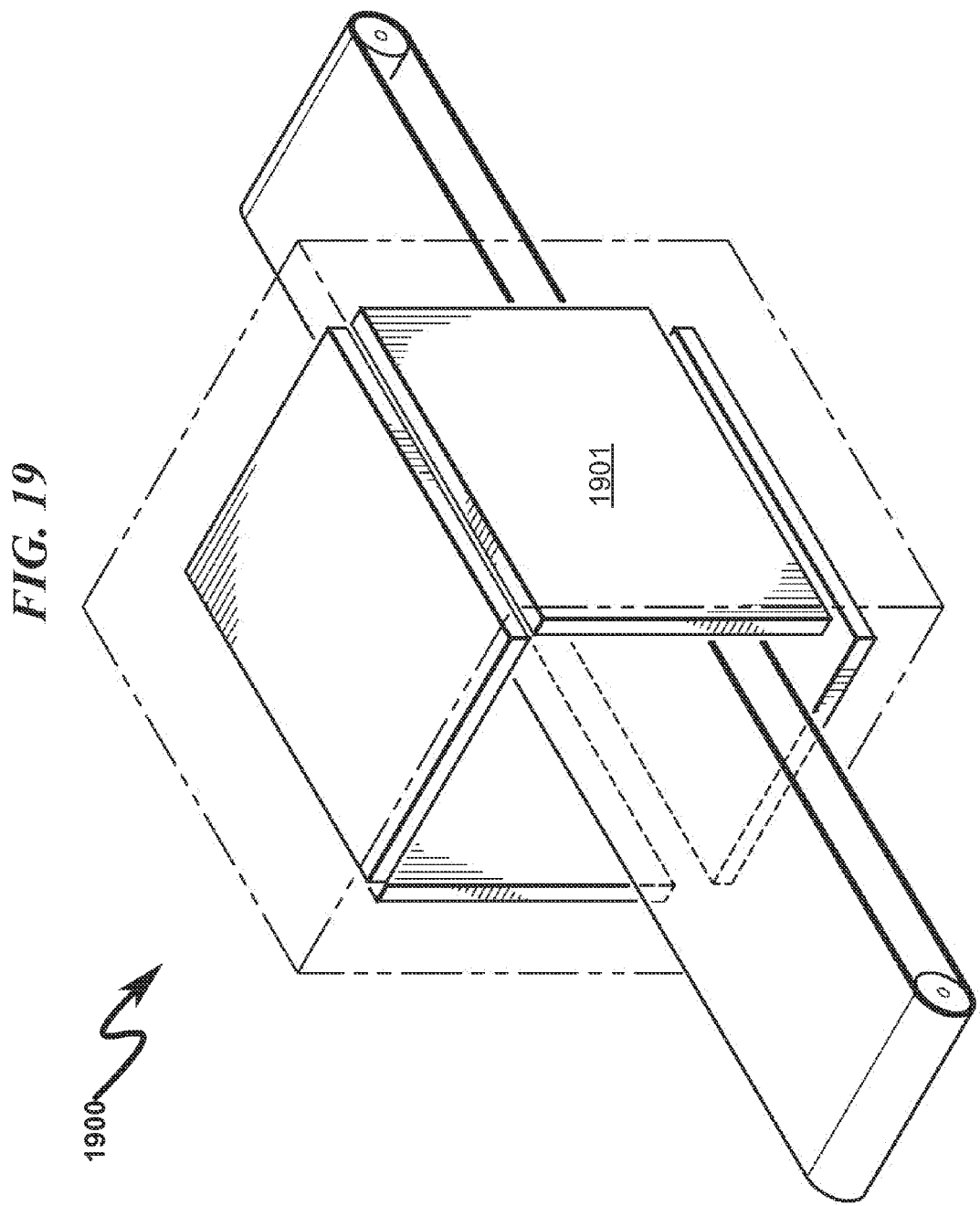
FIG. 19 illustrates an exemplary embodiment of the present invention as applied to a laundry radiation monitoring system.

The present invention has application to a variety of radiation detection contexts, several of which are preferred. One of these is in the construction of a laundry radiation detector/monitor/scanner. As generally illustrated in FIG. 18 (1800), the prior art in this field utilized multiple radiation detectors (1801, 1802) that were stacked and arranged to cover a conveyor belt (1803). As mentioned previously, this approach suffers from poor detection sensitivity and high implementation cost. This laundry radiation detector/monitor/scanner application may be constructed using the present invention as depicted in FIG. 19 (1900), wherein only radiation detector element (1901) is necessary to achieve the functionality of the prior art, while simultaneously increasing detector sensitivity and reducing overall system cost.

Tool/Article Radiation Monitor System Application (2000,2100)

Figure 20:
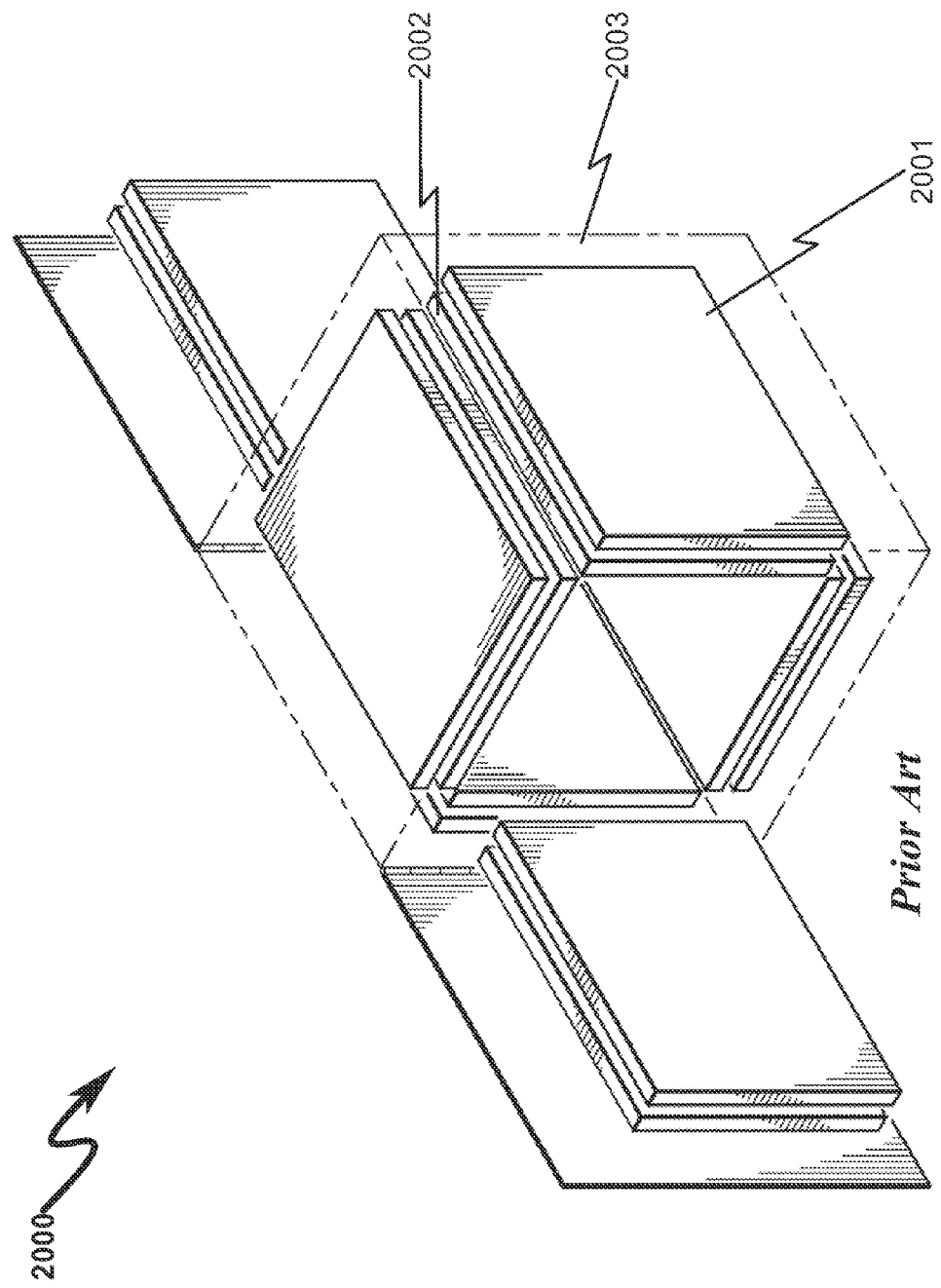
FIG. 20 illustrates an exemplary prior art tools and articles radiation monitoring system utilizing prior art alpha/beta detectors and separate plastic gamma detectors.
Figure 21:
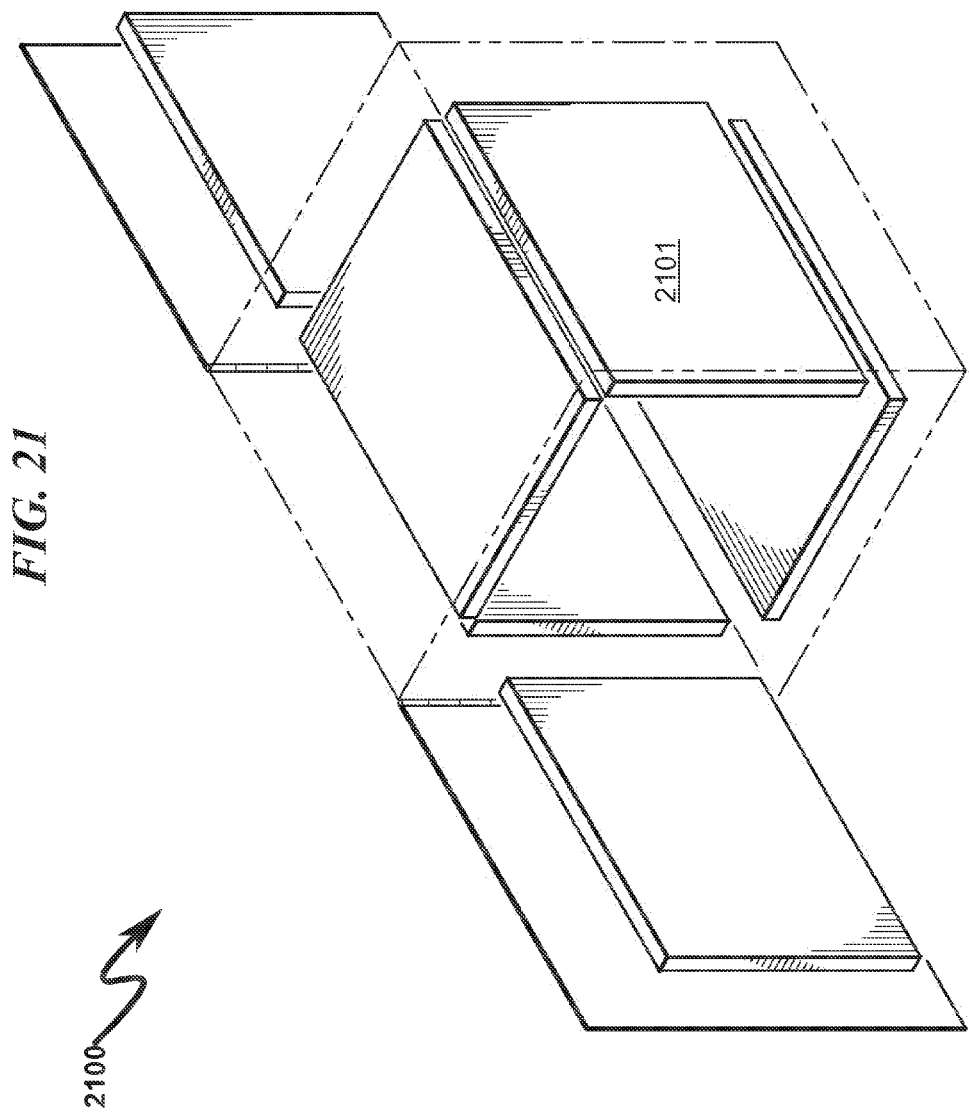
FIG. 21 illustrates an exemplary embodiment of the present invention as applied to a tools and articles radiation monitoring system.

The present invention has application to a variety of radiation detection contexts, several of which are preferred. One or these is in the construction of tool and article radiation detector/monitor/scanner. As generally illustrated in FIG. 20 (2000), the prior art in this field utilized multiple radiation detectors (2001, 2002) that were arranged on the faces of a box structure (2003) to permit radiation inspection of tools and/or other articles. As mentioned previously, this approach suffers from poor detection sensitivity and high implementation cost. This tool/article radiation detector/monitor/scanner application may be constructed using the present invention as depicted in FIG. 21 (2100), wherein only a single radiation detector element (2101) is necessary to achieve the functionality of the prior art, while simultaneously increasing detector sensitivity and reducing overall system cost.

System Advantages

There are several advantages to the present invention system/method as detailed herein. Many of these deal with the compact nature of the resulting radiation detector. Compared to the prior art, the distance between the plastic gamma scintillator and the monitored object is significantly reduced.

FIG. 1 (0100) illustrates the relative distances in the prior art between the plastic gamma scintillator (0105) and the front face of the alpha/beta detector (0103) is approximately 51 mm. The distance between the front face of the alpha/beta detector and the subject person (0101) being monitored in a whole body radiation monitor system context varies depending upon the body shape (morphology) of the individual (0101) being monitored. With the implementation of the present invention in a whole body radiation monitor system, the separate plastic gamma scintillator (0105) is eliminated, as generally illustrated in FIG. 2 (0200).

Since the strength of the ionizing radiation signal is inversely proportional, to the square of the distance between the signal source and detector, from FIG. 1 (0100) it can be seen that the gamma signal detected by the plastic gamma detector (0105) would be inversely proportional to the square of the sum of the distances to the individual detectors (including the thickness of the alpha/beta detector (0103). Using typical numbers, the distance on average between the person (0101) and the plastic gamma detector=50 mm+50 mm+30 mm=130 mm.

In contrast with the prior art, the present invention situates the plastic gamma detector (0202) about 50 mm from the subject person (0201) being monitored. Applying the R-squared law, the gamma detection sensitivity in a whole body radiation monitor utilizing the present invention compared to the prior art configuration illustrated in FIG. 1 (0100) is increased by a factor of (130/50)*(130/50)=6.76.

Figure 17:
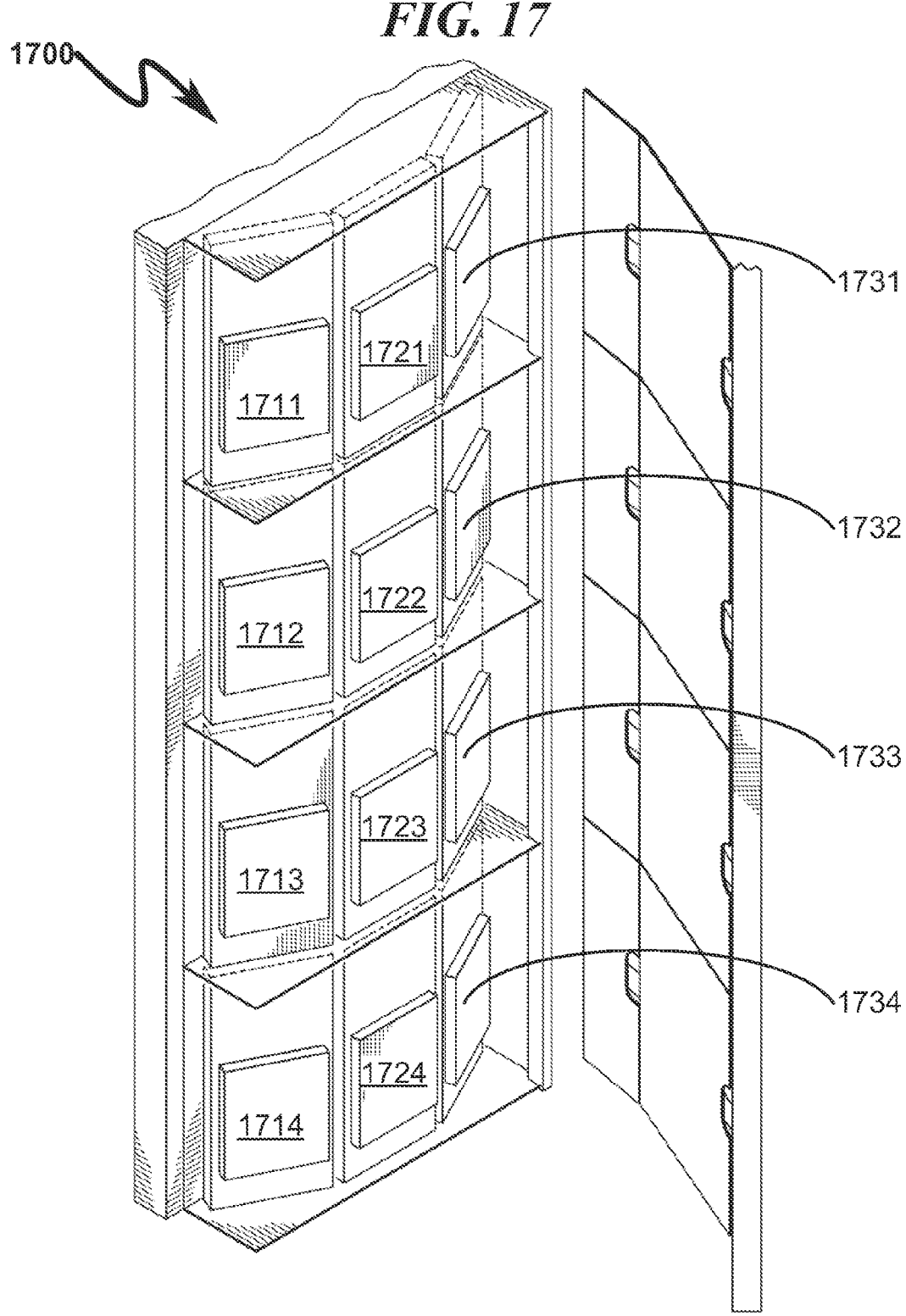
FIG. 17 illustrates a perspective view of an exemplary embodiment of the present invention as applied to a whole body radiation monitoring system.

Additional benefits of the present invention may include reduced physical space requirements, since a whole body radiation monitor typically uses 25 or more radiation detectors in its construction (see FIG. 17 (1700)). The simplified mechanical design due to the elimination of the separate plastic gamma detectors also results in significantly reduced overall system cost. The compact nature of the ISD modules in this application drastically reduces the overall space requirements for whole body radiation monitor systems as compared to the prior art.

Finally, increased sensitivity of the ISD configuration disclosed herein can result in significantly reduced scanning times in whole body monitoring radiation monitoring systems, a significant improvement in throughput capability as compared to the scanning time possible with the multi-detector methodologies and configurations taught by the prior art.

System Summary

The present invention system anticipates a wide variety of variations in the basic theme of construction, but can be generalized as a radiation detector system comprising:

(a) scintillation array stack;
(b) photomultiplier tube;
(c) shaping amplifier;
(d) discriminator;
(e) anti-coincidence module; and
(f) radiation counter;
wherein
the scintillation array stack is responsive to more than one band of radiation;
the scintillation array stack is in proximity to the photomultiplier tube, the photomultiplier tube receiving excitation input from the scintillation array stack;
the shaping amplifier receives the output of the photomultiplier tube and produces one or more radiation pulses based on the excitation and output of the photomultiplier tube;
the discriminator receives the radiation pulses and produces a pulse output depending on whether the radiation pulses it a threshold and pulse width profile associated with a radiation, type; and
the anti-coincidence module receives the pulse output and increments associated radiation counter based on whether the pulse output is valid for the radiation type associated with the radiation counter.

This general system summary may be augmented by the various elements described herein to produce a wide variety of invention embodiments consistent with this overall design description.

Alternate Embodiment System Summary

The present invention system anticipates a wide variety of variations in the basic theme of construction, with an alternative ISD embodiment generalized as a radiation detector system comprising:
(a) scintillation array stack;
(b) photomultiplier tube;
(c) shaping amplifier;
(d) discriminator;
(e) anti-coincidence module; and
(f) radiation counter;
wherein
the scintillation array stack comprises scintillation materials forming an integrated scintillation detector (ISD) further comprising beta scintillator plate, alpha scintillator plate, and gamma scintillator plate stacked with no inter-layer gaps within a detector case;
the scintillation array stack is in proximity to the photomultiplier tube, the photomultiplier tube receiving excitation input from the scintillation array stack;
the shaping amplifier receives the output of the photomultiplier tube and produces one or more radiation pulses based on the excitation and output of the photomultiplier tube;
the discriminator receives the radiation pulses and produces a pulse output depending on whether the radiation pulses fit a threshold and pulse width profile associated with a radiation type; and
the anti-coincidence module receives the pulse output and increments an associated radiation counter based on whether the pulse output is valid for the radiation type associated with the radiation counter.

This general system summary may be augmented by the various elements described herein to produce a wide variety of invention embodiments consistent with this overall design description.

Alternate ISD Embodiment System Summary

In some preferred embodiments the present invention system may primarily comprise an integrated scintillation detector (ISD), this generalized as a radiation detector system comprising an integrated scintillation detector (ISD), the ISD comprising:
(a) alpha scintillator plate;
(b) beta scintillator plate;
(c) beta particle shield plate;
(d) gamma scintillator plate;
(e) photomultiplier tube; and
(f) detector case;
wherein
the alpha scintillator plate, the beta scintillator plate, the beta particle shield plate, and the gamma scintillator plate are stacked to form a scintillation array stack with no inter-layer gaps between the plates;
the scintillation array stack is housed within the detector case;
the photomultiplier tube is housed within the detector case;
the scintillation array stack is in proximity to the photomultiplier tube within the detector case; and
the photomultiplier tube is oriented to receive excitation input from the scintillation array stack.

This general system summary may be augmented by the various elements described hereon to produce a wide variety of invention embodiments consistent with this overall design description.

System Context (2200)

Figure 22:
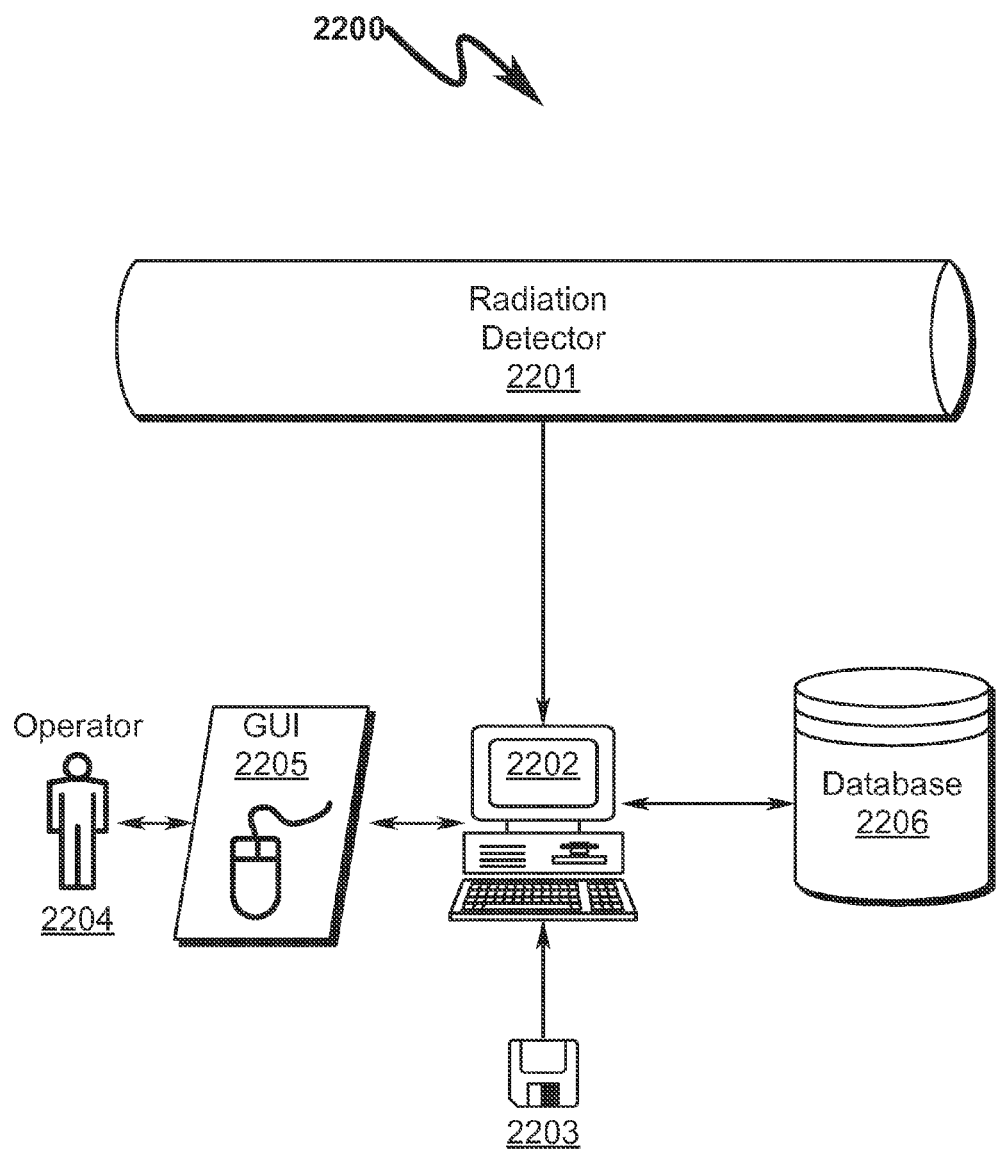
FIG. 22 illustrates an exemplary system context in which the present invention may be utilized to affect a radiation detection system under computer and/or operator control.

The present invention may be utilized in the context of an overall radiation detection system as generally illustrated in FIG. 22 (2200), wherein the radiation detector system (2201) described herein is connected to a computer system (2202) under control of software retrieved from a computer readable medium (2203). This software may permit an operator (2204) via a graphical user interface (GUI) (2205) or other interface to control or direct the computer system in this capacity. Data associated with the detection of radiation impinging on the radiation detector (2201) in this context may also be logged to a database (2206) that may be accessed locally by the computer system (2202) or remotely via a computer network.

Integrated Microcontroller Analysis (2300)

Figure 23:
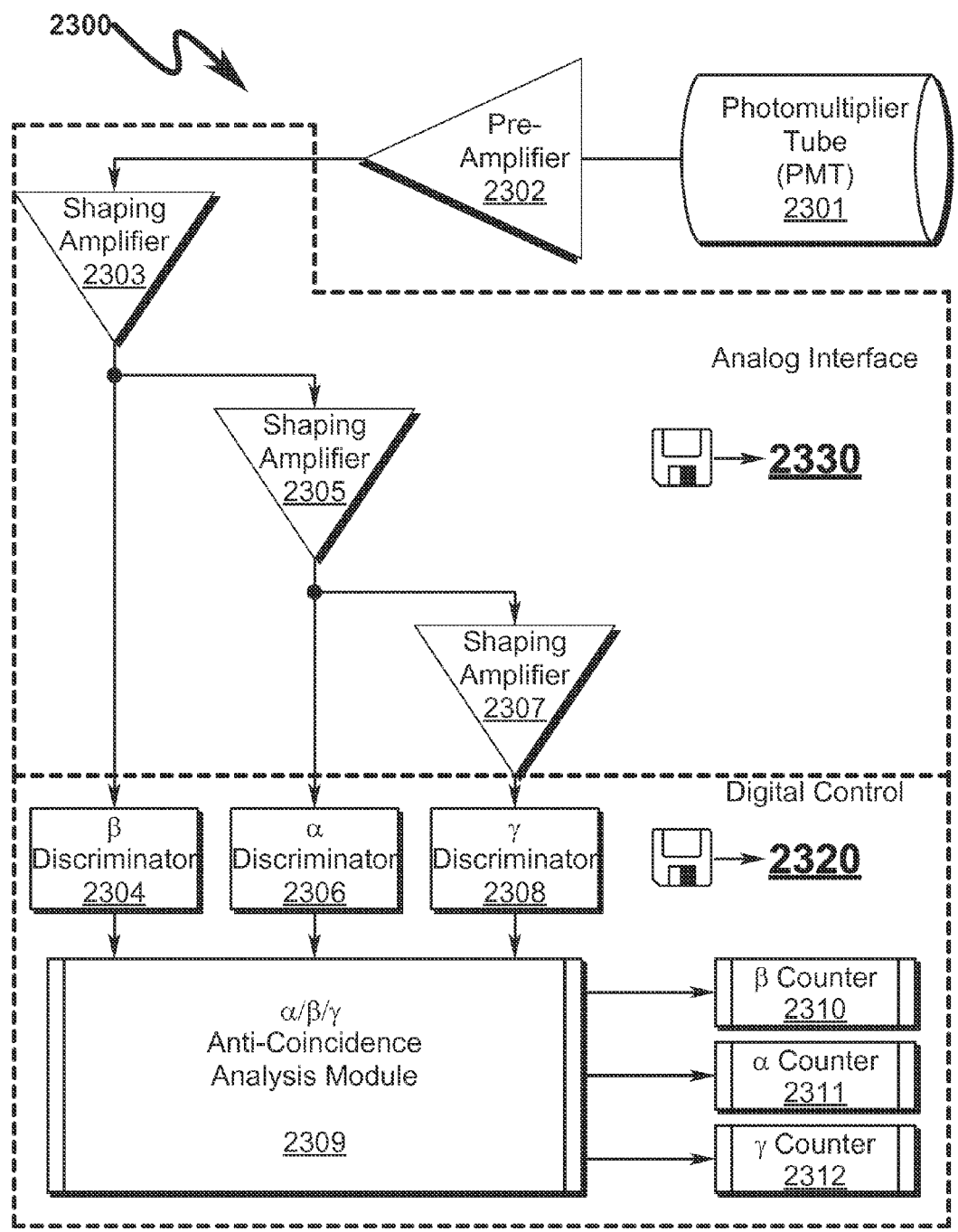
FIG. 23 illustrates an exemplary system embodiment of the present invention using integrated microprocessor analysis control.

While the present invention may be implemented in a wide variety of hardware platforms, one preferred embodiment utilizes an integrated microcontroller as generally depicted in FIG. 23 (2300). Within this context, the discriminators (2304, 2306, 2308), analysis module (2309) and counters (2310, 2311, 2312) may be embodied in a microcontroller (2320) or other integrated circuit operating under software read from a computer readable medium. Note that the output of the shaping amplifiers (2302, 2305, 2307) may be input to this processing subsystem (2320) in analog form and flash converted to digital data as needed to determine pulse amplitudes. Software residing on this microcontroller (2320) can also facilitate the pulse width analysis functions (2309) as well as pulse counting functions (2310, 2311, 2312).

Further integration of the system is possible wherein the shaping amplifiers (2303, 2304, 2305) are either integrated separately (2330) onto a single integrated circuit, or equivalently fully integrated with the control logic wherein the subsystems (2320) and (2330) are combined into an application specific integrated circuit (ASIC). One skilled in the art will recognize that this level of integration is well within the capabilities of one of ordinary skill in the semiconductor arts and thus need not be further detailed herein.

Method Summary (2400)

Figure 24:
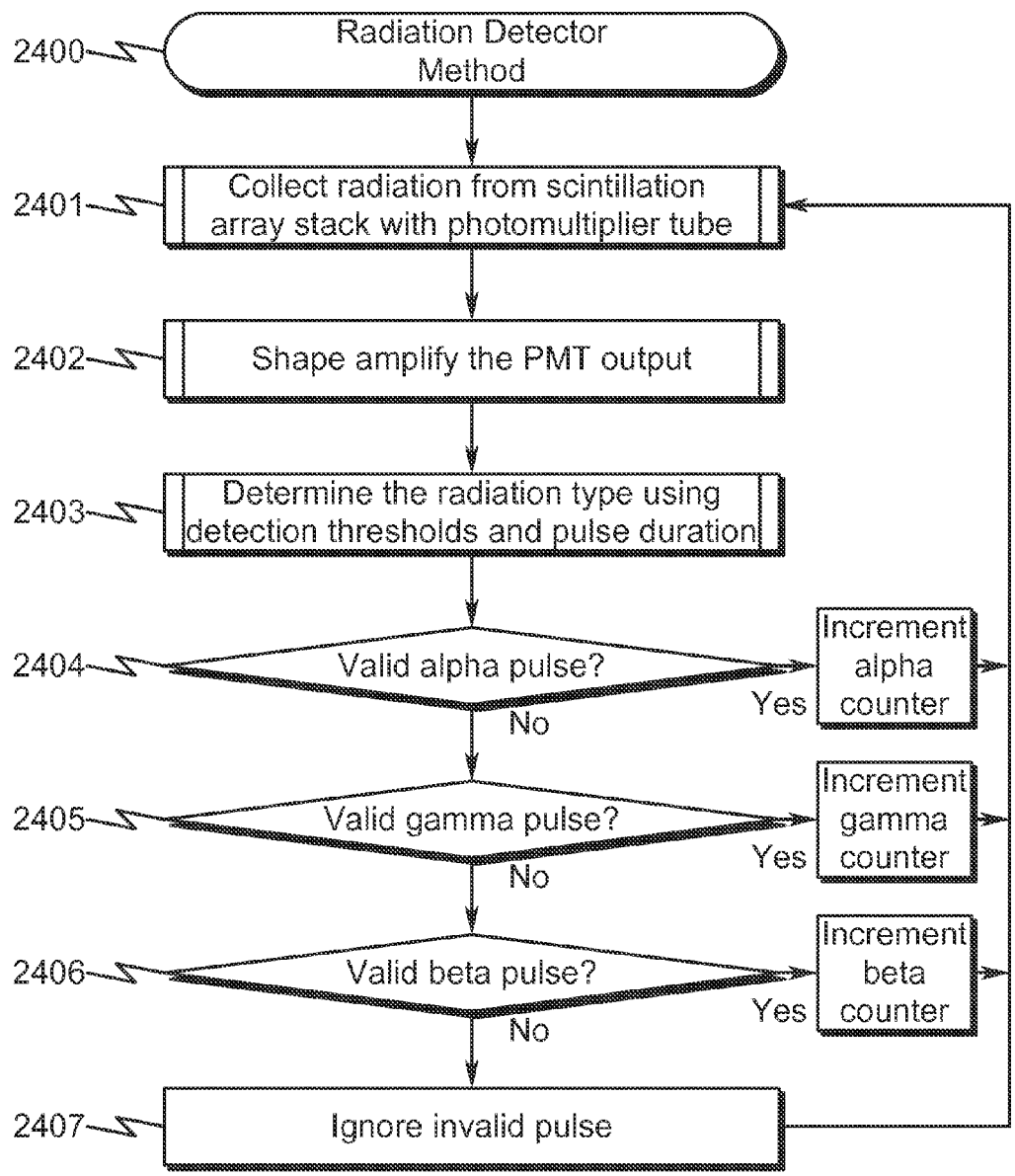
FIG. 24 illustrates a preferred exemplary embodiment of a radiation detection method utilizing the disclosed radiation detection system.

The present invention method anticipates a wide variety of variations in the basic theme of implementation, but can be generalized as a radiation detector method as illustrated in the flowchart of FIG. 24 (2400), the method operating in conjunction with a radiation detector system comprising:
- (a) scintillation array stack;
- (b) photomultiplier tube;
- (c) shaping amplifier;
- (d) discriminator;
- (e) anti-coincidence module; and
- (f) radiation counter;

wherein
the scintillation array stack is responsive to more than one band of radiation;
the scintillation array stack is in proximity to the photomultiplier tube, the photomultiplier tube receiving excitation input from the scintillation array stack;
the shaping amplifier receives the output of the photomultiplier tube and produces one or more radiation pulses based on the excitation and output of the photomultiplier tube;
the discriminator receives the radiation pulses and produces a pulse output depending on whether the radiation pulses fit a threshold and pulse width profile associated with a radiation type; and
the anti-coincidence module receives the pulse output and increments associated radiation counter based on whether the pulse output is valid for the radiation type associated with the radiation counter;

wherein the method comprises the steps of:
- (1) collecting radiation from a scintillation array stack with a photomultiplier tube (2401);
- (2) shape amplifying the output of the photomultiplier tube to produce shape amplified waveforms (2402);
- (3) determining the radiation, pulse type using detection thresholds and pulse durations from the shape amplified waveform (2403);
- (4) if the radiation pulse type is determined to be an alpha pulse, incrementing the alpha pulse counter and proceeding to step (1) (2404);
- (5) if the radiation pulse type is determined to be a gamma pulse, incrementing the gamma pulse counter and proceeding to step (1) (2405);
- (6) if the radiation pulse type is determined to be a beta pulse, incrementing the beta pulse counter and proceeding to step (1) (2406); and
- (7) ignoring the radiation pulse as invalid and proceeding to step (1) (2407).

Note that this method may incorporate displays, audible alarms, or other type of human and/or computer interfaces in conjunction with data logging and/or mathematical analysis of the collected radiation pulse count information. This general method summary may be augmented by the various elements described herein to produce a wide variety of invention embodiments consistent with this overall design description.

ISD Method Summary

The present invention also anticipates an ISD method variation in the basic theme of implementation, this variant generalized as a radiation detector method as illustrated in the flowchart of FIG. 24 (2400), the method operating in conjunction with a radiation detector system comprising:
- (a) scintillation array stack;
- (b) photomultiplier tube;
- (c) shaping amplifier;
- (d) discriminator;
- (e) anti-coincidence module; and
- (f) radiation counter;

wherein
the scintillation array stack comprises scintillation materials forming an integrated scintillation detector (ISD) further comprising alpha scintillator plate, beta scintillator plate, beta particle shield plate, and gamma scintillator plate stacked with no inter-layer gaps within a detector case;
the scintillation array stack is in proximity to the photomultiplier tube, the photomultiplier tube receiving excitation input from the scintillation array stack;
the shaping amplifier receives the output of the photomultiplier tube and produces one or more radiation pulses based on the excitation and output of the photomultiplier tube;
the discriminator receives the radiation pulses and produces a pulse output depending on whether the radiation pulses fit a threshold and pulse width profile associated with a radiation type; and
the anti-coincidence module receives the pulse output and increments an associated radiation counter based on whether the pulse output is valid for the radiation type associated with the radiation counter;

wherein the method comprises the steps of:
- (1) collecting radiation from a scintillation array stack with a photomultiplier tube (2401);
- (2) shape amplifying the output of the photomultiplier tube to produce shape amplified waveforms (2402);
- (3) determining the radiation pulse type using detention thresholds and pulse durations from the shape amplified waveform (2403);
- (4) if the radiation pulse type is determined to be an alpha pulse, incrementing the alpha pulse counter and proceeding to step (1) (2404);
- (5) if the radiation pulse type is determined to be a gamma pulse, incrementing the gamma pulse counter and proceeding to step (1) (2405);
- (6) if the radiation pulse type is determined to be a beta pulse, incrementing the beta pulse counter and proceeding to step (1) (2406); and
- (7) ignoring the radiation pulse as invalid and proceeding to step (1) (2407).

Nose that this method may incorporate displays, audible alarms, or other type of human and/or computer interfaces in conjunction with data logging and/or mathematical analysis of the collected radiation pulse count information. This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

- An embodiment wherein the scintillation materials are chosen to detect alpha and beta radiation.
- An embodiment wherein the scintillation materials are chosen to detect beta and gamma radiation.
- An embodiment wherein the scintillation materials are chosen to detect alpha, beta, and gamma radiation.
- An embodiment wherein the scintillation materials are chosen to detect alpha, beta, and gamma radiation with the time constants of the scintillation materials being medium, short, and long, respectively.
- An embodiment wherein the radiation detector is constructed in an array, the array incorporated into a whole body radiation contamination scanner.
- An embodiment wherein the radiation detector incorporated into a laundry radiation scanner.
- An embodiment wherein the radiation detector is incorporated into a tool/article radiation scanner.
- An embodiment wherein the output of the photomultiplier tube is conditioned by a pre-amplifier.
- An embodiment wherein the radiation detector forms an integrated scintillation detector (ISD) wherein scintillation array stack is constructed as a closely formed structure having no inter-layer gaps, the ISD presenting a reduced overall thickness profile while simultaneously increasing the beta/gamma radiation sensitivity of the radiation detector.
- An embodiment wherein the alpha scintillation plate comprises a scintillation material having a medium time constant.
- An embodiment wherein the beta scintillation plate comprises a scintillation material having a short time constant.
- An embodiment wherein the gamma scintillation plate comprises a scintillation material having a long time constant.
- An embodiment wherein radiation impinging on the scintillation array stack results in emissions from the scintillation array stack that are input to the photomultiplier tube, the emissions simultaneously detecting any impinging alpha and beta radiation by the photomultiplier tube.
- An embodiment wherein radiation impinging on scintillation array stack results in emissions from the scintillation array stack that are input to the photomultiplier tube, the emissions simultaneously detecting any impinging beta and gamma radiation by the photomultiplier tube.
- An embodiment wherein radiation impinging on the scintillation array stack results in emissions from the scintillation array stack that are input to the photomultiplier tube, the emissions simultaneously detecting any impinging alpha, beta, and gamma radiation by the photomultiplier tube.

One skilled in the art will recognize that other embodiments are possible based on combinations of elements taught within the above invention description.

CONCLUSION

A radiation detector system/method that simultaneously detects alpha/beta, beta/gamma, or alpha/beta/gamma radiation within an integrated detector has been disclosed. The system incorporates a photomultiplier tube with radiation scintillation materials to detect alpha/beta/gamma radiation. The photomultiplier tube output is then shape amplified and fed through discriminators to detect the individual radiation types. The discriminator outputs are fed to an anti-coincidence and pulse width and timing analysis module that determines whether individual alpha/beta/gamma pulses are valid and should be counted by corresponding alpha/beta/gamma, pulse radiation counters. The system may include a radiation detection method to affect alpha/beta/gamma radiation detection in a variety of contexts. The system/method may be implemented in a variety of applications, including but not limited to whole body radiation contamination, detectors, laundry radiation scanners, tool/article radiation detectors, and the like.

What is claimed is:

1. A radiation detector system comprising:
   (a) scintillation array stack;
   (b) photomultiplier tube;
   (c) shaping amplifier;
   (d) discriminator;
   (e) anti-coincidence module;
   (f) radiation counter; and
   (g) detector case;
   wherein
   said detector case is configured as a rectangular box structure;
   said rectangular box structure comprises a box length dimension larger than the depth of said rectangular box structure;
   said rectangular box structure comprises a box width dimension larger than the depth of said rectangular box structure;
   said scintillation array stack comprises scintillation materials responsive to more than one band of radiation;
   said scintillation array stack is configured in a planar rectangular form factor conforming to the perimeter of said rectangular box structure;
   said rectangular box structure is configured to contain said scintillation array stack and said photomultiplier tube;
   said scintillation array stack is in proximity to said photomultiplier tube, said photomultiplier tube receiving excitation input from said scintillation array stack;
   said shaping amplifier receives the output of said photomultiplier tube and produces one or more radiation pulses based on the excitation and output of said photomultiplier tube;
   said discriminator receives said radiation pulses and produces a pulse output depending on whether said radiation pulses fit a threshold and pulse width profile associated with a radiation type; and
   said anti-coincidence module is configured to receive said pulse output and determine whether said pulse output is valid for a given radiation type by the use of a truth table
   wherein:
      said truth table is configured to increment an alpha counter in said radiation counter if said pulse output is determined to be a valid alpha pulse; else
      said truth table is configured to increment a gamma counter in said radiation counter if said pulse output is determined to be a valid gamma pulse; else
      said truth table is configured to increment a beta counter in said radiation counter if said pulse output is determined to be a valid beta pulse; else
      said truth table is configured to reject said pulse output and not increment said radiation counter.

2. The radiation detector system of claim 1 wherein said scintillation materials are chosen to detect alpha and beta radiation.

3. The radiation detector system of claim 1 wherein said scintillation materials are chosen to detect beta and gamma radiation.

4. The radiation detector system of claim 1 wherein said scintillation materials are chosen to detect alpha, beta, and gamma radiation.

5. The radiation detector system of claim 1 wherein said scintillation materials are chosen to detect alpha, beta, and gamma radiation with the time constants of said scintillation materials being medium, short, and long, respectively.

6. The radiation detector system of claim 1 wherein said radiation detector is constructed in an array, said array incorporated into a whole body radiation contamination scanner.

7. The radiation detector system of claim 1 wherein said radiation detector is incorporated into a laundry radiation scanner.

8. The radiation detector system of claim 1 wherein said radiation detector is incorporated into a tool/article radiation scanner.

9. The radiation detector system of claim 1 wherein the output of said photomultiplier tube is conditioned by a pre-amplifier.

10. A radiation detector system comprising:
(a) scintillation array stack;
(b) photomultiplier tube;
(c) shaping amplifier;
(d) discriminator;
(e) anti-coincidence module;
(f) radiation counter; and
(g) detector case;
wherein
said detector case is configured as a rectangular box structure;
said rectangular box structure comprises a box length dimension larger than the depth of said rectangular box structure;
said rectangular box structure comprises a box width dimension larger than the depth of said rectangular box structure;
said scintillation array stack comprises scintillation materials forming an integrated scintillation detector (ISD) further comprising alpha scintillator plate, beta scintillator plate, beta particle shield plate, and gamma scintillator plate stacked with no inter-layer gaps within said detector case;
said scintillation array stack is in proximity to said photomultiplier tube, said photomultiplier tube receiving excitation input from said scintillation array stack;
said shaping amplifier receives the output of said photomultiplier tube and produces one or more radiation pulses based on the excitation and output of said photomultiplier tube;
said discriminator receives said radiation pulses and produces a pulse output depending on whether said radiation pulses fit a threshold and pulse width profile associated with a radiation type; and
said anti-coincidence module is configured to receive said pulse output and determine whether said pulse output is valid for a given radiation type by the use of a truth table wherein:
said truth table is configured to increment an alpha counter in said radiation counter if said pulse output is determined to be a valid alpha pulse; else
said truth table is configured to increment a gamma counter in said radiation counter if said pulse output is determined to be a valid gamma pulse; else
said truth table is configured to increment a beta counter in said radiation counter if said pulse output is determined to be a valid beta pulse; else
said truth table is configured to reject said pulse output and not increment said radiation counter.

11. The radiation detector system of claim 10 wherein said scintillation materials are chosen to detect alpha, beta, and gamma radiation with the time constants of said scintillation materials being medium, short, and long, respectively.

12. The radiation detector system of claim 10 wherein said radiation detector is constructed in an array, said array incorporated into a whole body radiation contamination scanner.

13. The radiation detector system of claim 10 wherein said radiation detector is incorporated into a laundry radiation scanner.

14. The radiation detector system of claim 10 wherein said radiation detector is incorporated into a tool/article radiation scanner.

15. The radiation detector system of claim 10 wherein the output of said photomultiplier tube is conditioned by a pre-amplifier.

16. A radiation detector method, said method operating in conjunction with a radiation detector system, said system comprising:
(a) scintillation array stack;
(b) photomultiplier tube;
(c) shaping amplifier;
(d) discriminator;
(e) anti-coincidence module;
(f) radiation counter; and
(g) detector case;
wherein
said detector case is configured as a rectangular box structure;
said rectangular box structure comprises a box length dimension larger than the depth of said rectangular box structure;
said rectangular box structure comprises a box width dimension larger than the depth of said rectangular box structure;
said scintillation array stack comprises scintillation materials responsive to more than one band of radiation;
said scintillation array stack is in proximity to said photomultiplier tube, said photomultiplier tube receiving excitation input from said scintillation array stack;
said shaping amplifier receives the output of said photomultiplier tube and produces one or more radiation pulses based on the excitation and output of said photomultiplier tube;
said discriminator receives said radiation pulses and produces a pulse output depending on whether said radiation pulses fit a threshold and pulse width profile associated with a radiation type; and
said anti-coincidence module is configured to receive said pulse output and determine whether said pulse output is valid for a given radiation type by the use of a truth table wherein:
said truth table is configured to increment an alpha counter in said radiation counter if said pulse output is determined to be a valid alpha pulse; else
said truth table is configured to increment a gamma counter in said radiation counter if said pulse output is determined to be a valid gamma pulse; else
said truth table is configured to increment a beta counter in said radiation counter if said pulse output is determined to be a valid beta pulse; else said truth table is configured to reject said pulse output and not increment said radiation counter
wherein said method comprises the steps of:
(1) collecting radiation from a scintillation array stack with a photomultiplier tube;
(2) shape amplifying the output of the photomultiplier tube to produce shape amplified waveforms;
(3) determining the radiation pulse type using 10 detection thresholds and pulse durations from the shape amplified waveform;
(4) if said radiation pulse type is determined to be an alpha pulse, incrementing an alpha pulse counter in said radiation counter and proceeding to said step (1);
(5) if said radiation pulse type is determined to be a gamma pulse, incrementing a gamma pulse counter in said radiation counter and proceeding to said step (1);
(6) if said radiation pulse type is determined to be a beta pulse, incrementing a beta pulse counter in said radiation counter and proceeding to said step (1); and
(7) ignoring said radiation pulse as invalid and proceeding to said step (1).

17. The radiation detector method of claim 16 wherein said scintillation materials are chosen to detect alpha and beta radiation.

18. The radiation detector method of claim 16 wherein said scintillation materials are chosen to detect beta and gamma radiation.

19. The radiation detector method of claim 16 wherein said scintillation materials are chosen to detect alpha, beta, and gamma radiation.

20. The radiation detector method of claim 16 wherein said scintillation materials are chosen to detect alpha, beta, and gamma radiation with the time constants of said scintillation materials being medium, short, and long, respectively.

21. The radiation detector method of claim 16 wherein said radiation detector is constructed in an array, said array incorporated into a whole body radiation contamination scanner.

22. The radiation detector method of claim 16 wherein said radiation detector is incorporated into a laundry radiation scanner.

23. The radiation detector method of claim 16 wherein said radiation detector is incorporated into a tool/article radiation scanner.

24. The radiation detector method of claim 16 wherein the output of said photomultiplier tube is conditioned by a pre-amplifier.

25. A radiation detector method, said method operating in conjunction with a radiation detector system, said system comprising:
(a) scintillation array stack;
(b) photomultiplier tube;
(c) shaping amplifier;
(d) discriminator;
(e) anti-coincidence module;
(f) radiation counter; and
(g) detector case;
wherein
said detector case is configured as a rectangular box structure;
said rectangular box structure comprises a box length dimension larger than the depth of said rectangular box structure;
said rectangular box structure comprises a box width dimension larger than the depth of said rectangular box structure;
said scintillation array stack comprises scintillation materials forming an integrated scintillation detector (ISD) further comprising alpha scintillator plate, beta scintillator plate, beta particle shield plate, and gamma scintillator plate stacked with no inter-layer gaps within said detector case;
said scintillation array stack is in proximity to said photomultiplier tube, said photomultiplier tube receiving excitation input from said scintillation array stack;
said shaping amplifier receives the output of said photomultiplier tube and produces one or more radiation pulses based on the excitation and output of said photomultiplier tube;
said discriminator receives said radiation pulses and produces a pulse output depending on whether said radiation pulses fit a threshold and pulse width profile associated with a radiation type; and
said anti-coincidence module is configured to receive said pulse output and determine whether said pulse output is valid for a given radiation type by the use of a truth table wherein:
said truth table is configured to increment an alpha counter in said radiation counter if said pulse output is determined to be a valid alpha pulse; else
said truth table is configured to increment a gamma counter in said radiation counter if said pulse output is determined to be a valid gamma pulse; else
said truth table is configured to increment a beta counter in said radiation counter if said pulse output is determined to be a valid beta pulse; else
said truth table is configured to reject said pulse output and not increment said radiation counter
wherein said method comprises the steps of:
(1) collecting radiation from a scintillation array stack with a photomultiplier tube;
(2) shape amplifying the output of the photomultiplier tube to produce shape amplified waveforms;
(3) determining the radiation pulse type using detection thresholds and pulse durations from the shape amplified waveform;
(4) if said radiation pulse type is determined to be an alpha pulse, incrementing an alpha pulse counter in said radiation counter and proceeding to said step (1);
(5) if said radiation pulse type is determined to be a gamma pulse, incrementing a gamma pulse counter in said radiation counter and proceeding to said step (1);
(6) if said radiation pulse type is determined to be a beta pulse, incrementing a beta pulse counter in said radiation counter and proceeding to said step (1); and
(7) ignoring said radiation pulse as invalid and proceeding to said step (1).

26. The radiation detector method of claim 25 wherein said scintillation materials are chosen to detect alpha, beta, and gamma radiation with the time constants of said scintillation materials being medium, short, and long, respectively.

27. The radiation detector method of claim 25 wherein said radiation detector is constructed in an array, said array incorporated into a whole body radiation contamination scanner.

28. The radiation detector method of claim 25 wherein said radiation detector is incorporated into a laundry radiation scanner.

29. The radiation detector method of claim 25 wherein said radiation detector is incorporated into a tool/article radiation scanner.

30. The radiation detector method of claim 25 wherein the output of said photomultiplier tube is conditioned by a pre-amplifier.

* * * * *